US012735937B2

(12) United States Patent
Gronlund et al.

(10) Patent No.: US 12,735,937 B2
(45) Date of Patent: Sep. 15, 2026

(54) SELECTIVE PLACEMENT OF ADVANCED COMPOSITES IN EXTRUDED ARTICLES AND BUILDING COMPONENTS

(71) Applicant: Andersen Corporation, Bayport, MN (US)

(72) Inventors: Patrick Jerome Gronlund, Mason, WI (US); Jessica Kathryn Ehrlichmann, Ramsey, MN (US); Trevor Dean Peterson, Stillwater, MN (US); Katherine April Stephan Graham, Inver Grove Heights, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 18/337,241

(22) Filed: Jun. 19, 2023

(65) Prior Publication Data

US 2024/0026726 A1 Jan. 25, 2024

Related U.S. Application Data

(63) Continuation of application No. 16/104,029, filed on Aug. 16, 2018, now Pat. No. 11,680,439.

(Continued)

(51) Int. Cl.

*E06B 3/20* (2006.01)
*B29C 48/00* (2019.01)

(Continued)

(52) U.S. Cl.

CPC .............. *E06B 3/20* (2013.01); *B29C 48/022* (2019.02); *B29C 48/11* (2019.02); *B29C 48/21* (2019.02);

(Continued)

(58) Field of Classification Search

None

See application file for complete search history.

(56) References Cited

U.S. PATENT DOCUMENTS

| | | | |
|---|---|---|---|
| 3,328,501 | A | 6/1967 | Barnett |
| 3,931,094 | A | 1/1976 | Segal et al. |

(Continued)

FOREIGN PATENT DOCUMENTS

| | | |
|---|---|---|
| CN | 1948665 | 4/2007 |
| CN | 102702649 | 10/2012 |

(Continued)

OTHER PUBLICATIONS

"Non-Final Office Action," for U.S. Appl. No. 17/668,871 mailed Sep. 19, 2023 (12 pages).

(Continued)

*Primary Examiner* — Thomas J Kessler

(74) *Attorney, Agent, or Firm* — Pauly, DeVries Smith & Deffner LLC

(57) ABSTRACT

Embodiments herein include extruded articles, building components and methods of making the same. In an embodiment, an extruded article is included. The extruded article can include a body member including a first portion comprising a first composition, the first composition comprising a polymer resin. The extruded body member can also include a second portion comprising a second composition different than the first composition. The second composition can include a polymer resin, fibers, and at least one component selected from the group consisting of at least 1% by weight particles and at least 5 phr impact modifier. Other embodiments are also included herein.

15 Claims, 23 Drawing Sheets

Related U.S. Application Data

(60) Provisional application No. 62/546,630, filed on Aug. 17, 2017.

(51) Int. Cl.

| | |
|---|---|
| ***B29C 48/11*** | (2019.01) |
| ***B29C 48/21*** | (2019.01) |
| ***B29C 70/02*** | (2006.01) |
| ***B29K 101/12*** | (2006.01) |
| ***B29K 309/08*** | (2006.01) |
| ***B29K 311/14*** | (2006.01) |
| ***B29L 31/00*** | (2006.01) |
| ***B32B 1/00*** | (2024.01) |
| ***B32B 27/20*** | (2006.01) |
| ***B32B 27/22*** | (2006.01) |
| ***E06B 3/22*** | (2006.01) |

(52) U.S. Cl.

CPC .............. *B29C 70/025* (2013.01); *E06B 3/22* (2013.01); *B29K 2101/12* (2013.01); *B29K 2309/08* (2013.01); *B29K 2311/14* (2013.01); *B29K 2995/0015* (2013.01); *B29K 2995/0089* (2013.01); *B29L 2031/005* (2013.01); *B32B 1/00* (2013.01); *B32B 27/20* (2013.01); *B32B 27/22* (2013.01); *B32B 2262/101* (2013.01); *B32B 2264/067* (2013.01); *B32B 2264/101* (2013.01); *B32B 2307/558* (2013.01); *B32B 2398/20* (2013.01); *B32B 2419/00* (2013.01)

(56) References Cited

U.S. PATENT DOCUMENTS 3,996,082 A 12/1976 Leatherman
4,100,325 A 7/1978 Summers et al.
4,183,777 A 1/1980 Summers et al.
4,514,449 A 4/1985 Budich et al.
4,627,472 A 12/1986 Goettler et al.
4,720,951 A 1/1988 Thorn et al.
4,958,469 A 9/1990 Plummer
5,145,892 A 9/1992 Yasukawa et al.
5,156,907 A 10/1992 Layden et al.
5,205,102 A 4/1993 Plummer
5,264,261 A 11/1993 Bush
5,273,819 A 12/1993 Jex
5,406,768 A 4/1995 Giuseppe et al.
5,441,801 A 8/1995 Deaner et al.
5,486,553 A 1/1996 Deaner et al.
5,491,940 A * 2/1996 Bruchu .................. B29C 65/20 52/214
5,497,594 A 3/1996 Giuseppe et al.
5,508,072 A 4/1996 Hodson et al.
5,518,677 A 5/1996 Deaner et al.
5,539,027 A 7/1996 Deaner et al.
5,612,413 A 3/1997 Rozkuszka et al.
5,661,939 A 9/1997 Coulis et al.
5,695,874 A 12/1997 Deaner et al.
5,705,571 A 1/1998 Tsiang et al.
5,707,571 A 1/1998 Reedy
5,773,138 A 6/1998 Seethamraju et al.
5,827,607 A 10/1998 Deaner et al.
D402,770 S 12/1998 Hendrickson et al.
5,858,522 A * 1/1999 Turk .................... B29C 48/022 428/394
5,874,146 A 2/1999 Kagan et al.
5,882,564 A 3/1999 Puppin
5,902,657 A 5/1999 Hanson et al.
5,932,334 A 8/1999 Deaner et al.
5,948,524 A 9/1999 Seethamraju et al.
5,981,067 A 11/1999 Seethamraju et al.
5,985,429 A 11/1999 Plummer et al.
6,004,668 A 12/1999 Deaner et al.
6,015,611 A 1/2000 Deaner et al.
6,015,612 A 1/2000 Deaner et al.
6,054,207 A 4/2000 Finley
6,122,877 A 9/2000 Hendrickson et al.
6,140,455 A 10/2000 Nagashima et al.
6,197,412 B1 3/2001 Jambois
6,210,792 B1 4/2001 Seethamraju et al.
6,265,037 B1 7/2001 Godavarti et al.
6,280,667 B1 * 8/2001 Koenig ................ B29C 48/832 264/173.17
6,342,172 B1 1/2002 Finley
6,346,160 B1 2/2002 Puppin
6,357,197 B1 3/2002 Serino et al.
6,365,081 B1 4/2002 Beck
6,875,385 B2 4/2005 Hawley et al.
6,899,782 B1 5/2005 Chang et al.
7,041,716 B2 5/2006 Ton-That et al.
7,173,082 B2 2/2007 Ahn et al.
7,691,305 B2 4/2010 Sutton et al.
7,858,008 B2 12/2010 Lee et al.
8,211,341 B2 7/2012 Lustiger
8,586,662 B2 11/2013 Harder et al.
8,784,719 B2 7/2014 Lingannaiah et al.
8,829,097 B2 9/2014 Deaner et al.
8,852,488 B2 10/2014 Sain et al.
8,940,132 B2 1/2015 Sain et al.
9,221,974 B2 12/2015 Rexin et al.
10,550,257 B2 2/2020 Peterson et al.
11,267,963 B2 3/2022 Peterson et al.
11,680,439 B2 6/2023 Gronlund
11,813,818 B2 11/2023 Ehrlichmann et al.
12,071,537 B2 8/2024 Peterson et al.
2002/0106498 A1 8/2002 Deaner et al.
2003/0096096 A1 * 5/2003 Jo .......................... B29C 48/11 428/297.4
2005/0160677 A1 * 7/2005 Gepfrey ................ E06B 3/9641 49/504
2006/0065993 A1 3/2006 Stucky et al.
2006/0175325 A1 8/2006 Day et al.
2007/0141316 A1 6/2007 McGrath et al.
2008/0021135 A1 1/2008 Garft et al.
2009/0181207 A1 7/2009 Michalik et al.
2009/0246544 A1 * 10/2009 Narita ..................... C08J 7/048 525/450
2010/0107530 A1 * 5/2010 Pietruczynik ........... B29C 48/07 52/313
2012/0220697 A2 8/2012 Deaner et al.
2013/0217815 A1 * 8/2013 Deaner .................... C08K 3/40 524/195
2016/0230015 A1 * 8/2016 Law .......................... C08J 3/24
2017/0240737 A1 8/2017 Peterson et al.
2017/0240738 A1 8/2017 Ehrlichmann et al.
2018/0195339 A1 * 7/2018 Kuster .................... E06B 3/677
2019/0071918 A1 3/2019 Gronlund et al.
2020/0131355 A1 4/2020 Peterson et al.
2022/0162437 A1 5/2022 Peterson et al.
2025/0066596 A1 2/2025 Peterson et al.

FOREIGN PATENT DOCUMENTS

EP 0458520 11/1991
EP 0902148 3/1999
EP 1589076 10/2005
EP 1813644 8/2007
EP 1842657 10/2007
EP 2031169 3/2009
EP 2031169 A2 * 3/2009 ............ E06B 3/221
EP 2384879 11/2011
JP 2008273217 11/2008
JP 2012200894 10/2012
WO 2004083541 9/2004
WO 2005090469 9/2005
WO 2009098280 8/2009
WO 2010008199 1/2010
WO 2012105915 8/2012
WO 2015120429 8/2015

(56) References Cited

FOREIGN PATENT DOCUMENTS

| | | |
|---|---|---|
| WO | 2017147259 | 8/2017 |
| WO | 2017147268 | 8/2017 |

OTHER PUBLICATIONS

"Notice of Allowance," for U.S. Appl. No. 15/439,603 mailed Jun. 30, 2023 (19 pages).
"Notice of Allowance," for U.S. Appl. No. 17/668,871 mailed Apr. 24, 2024 (10 pages).
"Office Action," for Canadian Patent Application No. 3015339 mailed Dec. 7, 2023 (7 pages).
"Office Action," for Canadian Patent Application No. 3015362 mailed Dec. 11, 2023 (4 pages).
"Response to Communication Pursuant to Article 94(3) EPC," for European Patent Application No. 17709855.5 filed Jun. 19, 2023 (10 pages).
"Response to Non-Final Office Action," for U.S. Appl. No. 17/668,871, filed Jan. 19, 2024 (7 pages).
"Response to Office Action," for Canadian Patent Application No. 3,015,339 filed Apr. 2, 2024 (19 pages).
"Response to Office Action," for Canadian Patent Application No. 3,015,339 filed Jul. 6, 2023 (106 pages).
"Response to Office Action," for Canadian Patent Application No. 3,015,362 filed Jul. 6, 2023 (44 pages).
"Communication Pursuant to Article 94(3) EPC," for European Patent Application No. 17711037.6 mailed Jun. 26, 2024 (5 pages).
"Biostrength 150 Technical Datasheet," Published by Arkema and archived online on Jun. 7, 2016 at https://web.archive.org/web/20160607205030/https://www.palmerholland.com/Assets/User/Documents/Product/45833/5890/MITM10308.PDF (Year: 2016), 2 pages.
"Communication Pursuant to Article 94(3) EPC," for European Patent Application No. 17709855.5 mailed Feb. 22, 2023 (5 pages).
"Communication Pursuant to Article 94(3) EPC," for European Patent Application No. 17709855.5 mailed May 25, 2021 (5 pages).
"Communication Pursuant to Article 94(3) EPC," for European Patent Application No. 17711037.6 mailed Dec. 23, 2022 (4 pages).
"Communication Pursuant to Article 94(3) EPC," for European Patent Application No. 17711037.6 mailed May 17, 2021 (4 pages).
"DuPont Elvaloy Polymer Modifier for Rigid PVC Compounds Product Brochure," http://www.dupont.com/content/dam/dupont/products-and-services/packaging-materials-and-solutions/packaging-materials-and-solutions-landing/documents/Elvaloy_RigidPVC_Brochure.pdf, Oct. 2009 (4 pages).
"File History," for U.S. Appl. No. 15/439,586 retrieved Jun. 15, 2023 (159 pages).
"File History," for U.S. Appl. No. 16/104,029 retrieved Jun. 15, 2023 (265 pages).
"File History," for U.S. Appl. No. 16/730,110 retrieved Jun. 15, 2023 (222 pages).
"International Preliminary Report on Patentability," for PCT Application No. PCT/US2017/019072 mailed Sep. 7, 2018 (10 pages).
"International Preliminary Report on Patentability," for PCT Application No. PCT/US2017/019085 mailed Sep. 7, 2018 (10 pages).
"International Preliminary Report on Patentability," for PCT Application No. PCT/US2018/046886 mailed Feb. 27, 2020 (8 pages).
"International Search Report and Written Opinion," for PCT Application No. PCT/US2017/019072 mailed May 15, 2017 (32 pages).
"International Search Report and Written Opinion," for PCT Application No. PCT/US2017/019085 mailed May 31, 2017 (14 pages).
"International Search Report and Written Opinion," for PCT Application No. PCT/US2018/046886 mailed Jan. 7, 2019 (11 pages).
"Office Action," for Canadian Patent Application No. 3015339 mailed Mar. 10, 2023 (7 pages).
"Office Action," for Canadian Patent Application No. 3015362 mailed Mar. 9, 2023 (6 pages).
"Partial File History," for U.S. Appl. No. 15/439,603 retrieved Jun. 15, 2023 (318 pages).
"Partial File History," for U.S. Appl. No. 17/668,871 retrieved Jun. 15, 2023 (169 pages).
"Response to Communication Pursuant to Article 94(3) EPC," for European Patent Application No. 17709855.5 filed Nov. 24, 2021 (11 pages).
"Response to Communication Pursuant to Article 94(3) EPC," for European Patent Application No. 17711037.6 filed May 2, 2023 (8 pages).
"Response to Communication Pursuant to Article 94(3) EPC," for European Patent Application No. 17711037.6 filed Nov. 23, 2021 (9 pages).
"Response to Communication Pursuant to Rules 161(1) and 162 EPC," for European Patent Application No. 17709855.5 filed Apr. 10, 2019 (19 pages).
"Response to Communication Pursuant to Rules 161(1) and 162 EPC," for European Patent Application No. 17711037.6 filed Apr. 10, 2019 (15 pages).
"Response to Communication Pursuant to Rules 161(1) and 162 EPC," for European Patent Application No. 18789513.1 filed Oct. 9, 2020 (15 pages).
Clemons, Craig M. "Wood Flour," Functional Fillers for Plastics, 2010, p. 269-283 (24 pages).
Giles, Harold, et al. "Extrusion: the Definitive Processing Guide and Handbook," William Andrew Inc., 2005, pp. 166, 375-376, and 386-388 (9 pages).
"Communication pursuant to Article 94(3) EPC," for European Patent Application No. 18789513.1 mailed Oct. 14, 2024 (5 pages).
"Office Action," for Canadian Patent Application No. 3,015,339 mailed Oct. 25, 2024 (5 pages).
"Response to Communication Pursuant to Article 94(3) EPC," for European Patent Application No. 17711037.6 filed Oct. 16, 2024 (15 pages).
"Response to Office Action," for Canadian Patent Application No. 3,015,339 filed Feb. 24, 2025 (19 pages).
"Office Action," for Canadian Patent Application No. 3,015,339 mailed Jul. 15, 2025 (4 pages).
"Response to Communication pursuant to Article 94(3)," for European Patent Application No. 17711037.6 filed Jul. 28, 2025 (29 pages).
"Response to Office Action," for Canadian Patent Application No. 3,015,362 filed Jul. 28, 2025 (23 pages).
"Office Action," for Canadian Patent Application No. 3,015,362 mailed Apr. 2, 2025 (3 pages).
"Response to Communication pursuant to Article 94(3) EPC," for European Patent Application No. 18789513.1 filed Apr. 14, 2025 (12 pages).
"Response to Non-Final Office Action," for Canadian Patent Application No. 3072985 filed Apr. 21, 2025 (12 pages).
"Communication Pursuant to Article 94(3) EPC," for European Patent Application No. 17711037.6 mailed Jan. 28, 2025 (18 pages).
"Non-Final Office Action," for Canadian Patent Application No. 3072985 mailed Dec. 20, 2024 (7 pages).
"Communication pursuant to Article 94(3)," for European Patent Application No. 17711037.6 mailed Oct. 16, 2025 (6 pages).
"Response to Office Action," for Canadian Patent Application No. 3,015,339 filed Nov. 5, 2025 (14 pages).
"Response to Communication pursuant to Article 94(3)," for European Patent Application No. 17711037.6 filed Feb. 10, 2026 (3 pages).
"Non-Final Office Action," for U.S. Appl. No. 18/790,438 mailed Apr. 20, 2026 (46 pages).
"Office Action," for CA Patent Application No. 3072985 mailed Mar. 17, 2026 (6 pages).
"Response to Non-Final Office Action," for U.S. Appl. No. 18/790,438, filed on Jul. 10, 2026 (7 pages).

* cited by examiner 300
304
302
316
308
312
310
314
702
704
306

300
304
302
842
316
846
308
820
848
844
312
808
804
840
314
810
806
850
830
811
802
832
834
310
306
836

302
1200
1202
1214
1213
1204
1206

302
1200
1212
1202
1213
1204
1206

302
316
1200
1202
1230

SELECTIVE PLACEMENT OF ADVANCED COMPOSITES IN EXTRUDED ARTICLES AND BUILDING COMPONENTS

This application is a continuation of U.S. patent application Ser. No. 16/104,029, filed Aug. 16, 2018, which claims the benefit of U.S. Provisional Application No. 62/546,630, filed Aug. 17, 2017, the content of which is herein incorporated by reference in its entirety.

FIELD

Embodiments herein relate to composite extrusions. More specifically, embodiments herein relate to extrusions and building components including the same with selective placement of advanced composite materials.

BACKGROUND

Conventional window and door manufacturers have commonly used wood and metal components in forming structural members. Commonly, residential windows are manufactured from milled wood products or extruded aluminum or polymeric parts that are assembled with glass to form typically double hung or casement units. Wood windows, while structurally sound, useful and well adapted for use in many residential installations, can deteriorate under certain circumstances. Wood windows also require painting and other periodic maintenance. Wood windows also suffer from cost problems related to the availability of suitable wood for construction. Clear wood products are slowly becoming scarcer and are becoming more expensive as demand increases. Metal components are often combined with glass and formed into single unit sliding windows. Metal windows can suffer from substantial energy loss during winter months.

Extruded thermoplastic materials have also been used as components in window and door manufacture. Filled and unfilled thermoplastics have been extruded into useful seals, trim, weather stripping, coatings and other window construction components. However, existing extruded materials have various drawbacks including those relating to cost, performance, and aesthetics.

SUMMARY

Embodiments herein include compositions, extruded articles, and methods of making the same. In some embodiments, an extruded article can be included. The extruded article can include a body member having a first portion including a first composition. The first composition can include a polymer resin. The body member can also include a second portion. The second portion can include a second composition, where the second composition can be different than the first composition. The second composition can include a polymer resin, fibers, and at least one component selected from the group including at least 1% by weight particles and at least 5 phr impact modifier.

In some embodiments, a fenestration unit can be included, where the fenestration unit can include a frame and a glazing unit disposed within the frame. The frame can include an extruded article. The extruded article can include a body member having a first portion including a first composition. The first composition can include a polymer resin and a second portion. The second portion can include a second composition, where the second composition can be different than the first composition. The second composition can include a polymer resin, fibers, and at least one component selected from the group including at least 1% by weight particles and at least 5 phr impact modifier.

In an embodiment, an extruded article can be included. The extruded article can include a body member. The body member can include a first portion having a first composition, where the first composition can include a polymer resin. The body member can also include a second portion having a second composition. The second composition can be different than the first composition, where the second composition can include a polymer resin, fibers, and at least one component selected from the group including at least 1% by weight particles and at least 5 phr impact modifier. The second portion can further include a fastener port.

In some embodiments, a fenestration unit can be included. The fenestration unit can include a frame and a glazing unit disposed within the frame. The frame can include an extruded article. The extruded article can include a body member. The body member can include a first portion having a first composition, where the first composition can include a polymer resin. The body member can also include a second portion having a second composition. The second composition can be different than the first composition, where the second composition can include a polymer resin, fibers, and at least one component selected from the group including at least 1% by weight particles and at least 5 phr impact modifier. The second portion can further include a fastener port.

In some embodiments, an extruded article can be included, where the extruded article can include a body member. The body member can include external wall members, where the external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition, the first composition can include a polymer resin. At least one of the first lateral wall, the second lateral wall, the exterior wall, and the interior wall can further include a second composition different than the first composition. The second composition can include a polymer resin, fibers, and at least one component selected from the group including at least 1% by weight particles and at least 5 phr impact modifier.

In some embodiments, a fenestration unit can be included, where the fenestration unit can include a frame and a glazing unit disposed within the frame. The frame can include an extruded article. The extruded article can include a body member. The body member can include external wall members, where the external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition, where the first composition can include a polymer resin. At least one of the first lateral wall, the second lateral wall, the exterior wall, and the interior wall can further include a second composition different than the first composition. The second composition can include a polymer resin, fibers, and at least one component selected from the group including at least 1% by weight particles and at least 5 phr impact modifier.

In some embodiments, an extruded article can be included. The extruded article can include a body member having external wall members. The external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition including an extruded polymeric composition. At least one of the first lateral wall, the second lateral wall, the exterior wall, and the interior wall can further include a second composition including an extruded polymeric composite composition. The second composition can have a modulus of elasticity at least 50,000 psi higher than the first composition.

In some embodiments, a fenestration unit can be included. The fenestration unit can include a frame and a glazing unit disposed within the frame. The frame can include an extruded article. The extruded article can include a body member having external wall members. The external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition including an extruded polymeric composition. At least one of the first lateral wall, the second lateral wall, the exterior wall, and the interior wall can further include a second composition including an extruded polymeric composite composition. The second composition can have a modulus of elasticity at least 50,000 psi higher than the first composition.

In some embodiments, an extruded article can be included. The extruded article can include a body member having external wall members, where the external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition including an extruded polymeric composition. At least one of the first lateral wall, the second lateral wall, the exterior wall, and the interior wall can further include a second composition including an extruded polymeric composite composition. The second composition can have a modulus of elasticity at least 10 percent higher than the first composition.

In some embodiments, a fenestration unit can be included. The fenestration unit can include a frame and a glazing unit disposed within the frame. The frame can include an extruded article. The extruded article can include a body member having external wall members, where the external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first composition including an extruded polymeric composition. At least one of the first lateral wall, the second lateral wall, the exterior wall, and the interior wall can further include a second composition including an extruded polymeric composite composition. The second composition can have a modulus of elasticity at least 10 percent higher than the first composition.

In some embodiments, an extruded article can be included. The extruded article can include a body member having external wall members. The external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first portion and a second portion. The first portion can include a first composition, where the first composition can include a polymer resin. The second portion can include a second composition different than the first composition, where the second composition can include a polymer resin, at least 15% by weight fibers, and at least one component selected from the group including at least 1% by weight particles and at least 5 phr impact modifier.

In some embodiments, a fenestration unit can be included, where the fenestration unit can include a frame and a glazing unit disposed within the frame. The frame can include an extruded article. The extruded article can include a body member having external wall members. The external wall members can include an exterior wall, an interior wall disposed opposite the exterior wall, a first lateral wall, and a second lateral wall disposed opposite the first lateral wall. At least one of the first lateral wall, the second lateral wall, the exterior wall, and the interior wall can include a first portion and a second portion. The first portion can include a first composition, where the first composition can include a polymer resin. The second portion can include a second composition different than the first composition, where the second composition can include a polymer resin, at least 15% by weight fibers, and at least one component selected from the group including at least 1% by weight particles and at least 5 phr impact modifier.

In some embodiments, an extruded article can be included. The extruded article can include a body member having a plurality of external walls and one or more internal walls. At least one of the external and internal walls comprises a first portion and a second portion, the first portion formed of a first composition, the first composition including a polymer resin. The second portion can be formed of a second composition different than the first composition. The second composition can include a polymer resin, at least 15% by weight fibers, and at least one component selected from the group including at least 1% by weight particles and at least 5 phr impact modifier.

In some embodiments, a fenestration unit can be included, where the fenestration unit can include a frame and an insulating glazing unit disposed within the frame. The frame can include an extruded article. The extruded article can include a body member having a plurality of external walls and one or more internal walls. At least one of the external and internal walls comprises a first portion and a second portion, the first portion formed of a first composition, the first composition including a polymer resin. The second portion can be formed of a second composition different than the first composition. The second composition can include a polymer resin, at least 15% by weight fibers, and at least one component selected from the group including at least 1% by weight particles and at least 5 phr impact modifier.

In some embodiments, an extruded article can be included. The extruded article can include a body member having an outer radius curved wall and an inner radius curved wall. The outer radius curved wall can include a composition including a polymer resin, fibers, and, at least one component selected from the group including particles and at least 5 phr impact modifier.

In some embodiments, a fenestration unit can be included, where the fenestration unit can include a frame and a glazing unit disposed within the frame. The frame can include a curved extruded article. The curved extruded article can include a body member having an outer radius curved wall and an inner radius curved wall. The outer radius curved wall can include a composition including a polymer resin, glass fibers, and, at least one component selected from the group including particles and at least 5 phr impact modifier.

In some embodiments, an extruded article is included. The extruded article can include a body member having an outer radius curved wall, an inner radius curved wall, and one or more internal walls, the internal walls. The internal walls can include a polymer resin; fibers, and at least one component selected from the group including particles and at least 5 phr impact modifier.

In some embodiments, a fenestration unit can be included, where the fenestration unit can include a frame; and a glazing unit disposed within the frame. The frame can include a curved extruded article. The extruded article can include a body member having an outer radius curved wall, an inner radius curved wall, and one or more internal walls, the internal walls. The internal walls can include a polymer resin; fibers, and at least one component selected from the group including particles and at least 5 phr impact modifier.

In some embodiments, an extruded article can be included. The extruded article can include a body member having a first portion including a first composition. The first composition can include a polymer resin. The body member can also include a second portion including a second composition. The second composition can be different than the first composition, where the second composition can include a polymer resin, fibers, and at least one component selected from the group including at least 1% by weight particles and at least 5 phr impact modifier. The second portion can further include a snap-fit mechanism.

In some embodiments, a fenestration unit can be included, where the fenestration unit can include a frame and a glazing unit disposed within the frame. The frame can include an extruded article. The extruded article can include a body member having a first portion including a first composition. The first composition can include a polymer resin. The body member can also include a second portion including a second composition. The second composition can be different than the first composition, where the second composition can include a polymer resin, fibers, and at least one component selected from the group including at least 1% by weight particles and at least 5 phr impact modifier. The second portion can further include a snap-fit mechanism.

In some embodiments, an extruded article can be included. The extruded article can include a body member having a first composition and a cap layer extruded over the body member. The cap layer can be formed of a second composition. The first composition can be different than the second composition. The coefficient of thermal expansion of the first composition can be from 0.5 to 2.0 (10-5 F-1) and the coefficient of thermal expansion of the second composition can be from 0.5 to 2.0 (10-5 F-1).

In some embodiments, a fenestration unit can be included, where the fenestration unit can include a frame and a glazing unit disposed within the frame. The frame can include an extruded article. The extruded article can include a body member having a first composition and a cap layer extruded over the body member. The cap layer can be formed of a second composition. The first composition can be different than the second composition. The coefficient of thermal expansion of the first composition can be from 0.5 to 2.0 ($10^{-5}$ $F^{-1}$) and the coefficient of thermal expansion of the second composition can be from 0.5 to 2.0 ($10^{-5}$ $F^{-1}$).

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Advanced polymeric composite materials have been developed that offer various advantages over previous polymeric composites. Advantages can include toughness, resistance to crack propagation, enhanced ductility, aesthetic smooth surfaces, and desirable coefficient of thermal expansion, amongst others. Aspects of these advanced composite materials are described in U.S. patent application Ser. Nos. 15/439,586 and 15/439,603, the content of which is herein incorporated by reference.

It has been found that by selectively incorporating these advanced composite materials within extruded articles, it is possible to achieve enhanced structural properties, aesthetics and/or energy efficiency amongst other benefits. Further, by virtue of the placement being selective, desirable properties can be maximized while minimizing costs. As such, embodiments herein include extruded articles and building components including extruded articles featuring selective placement of advanced polymeric composite materials.

Figure 1:
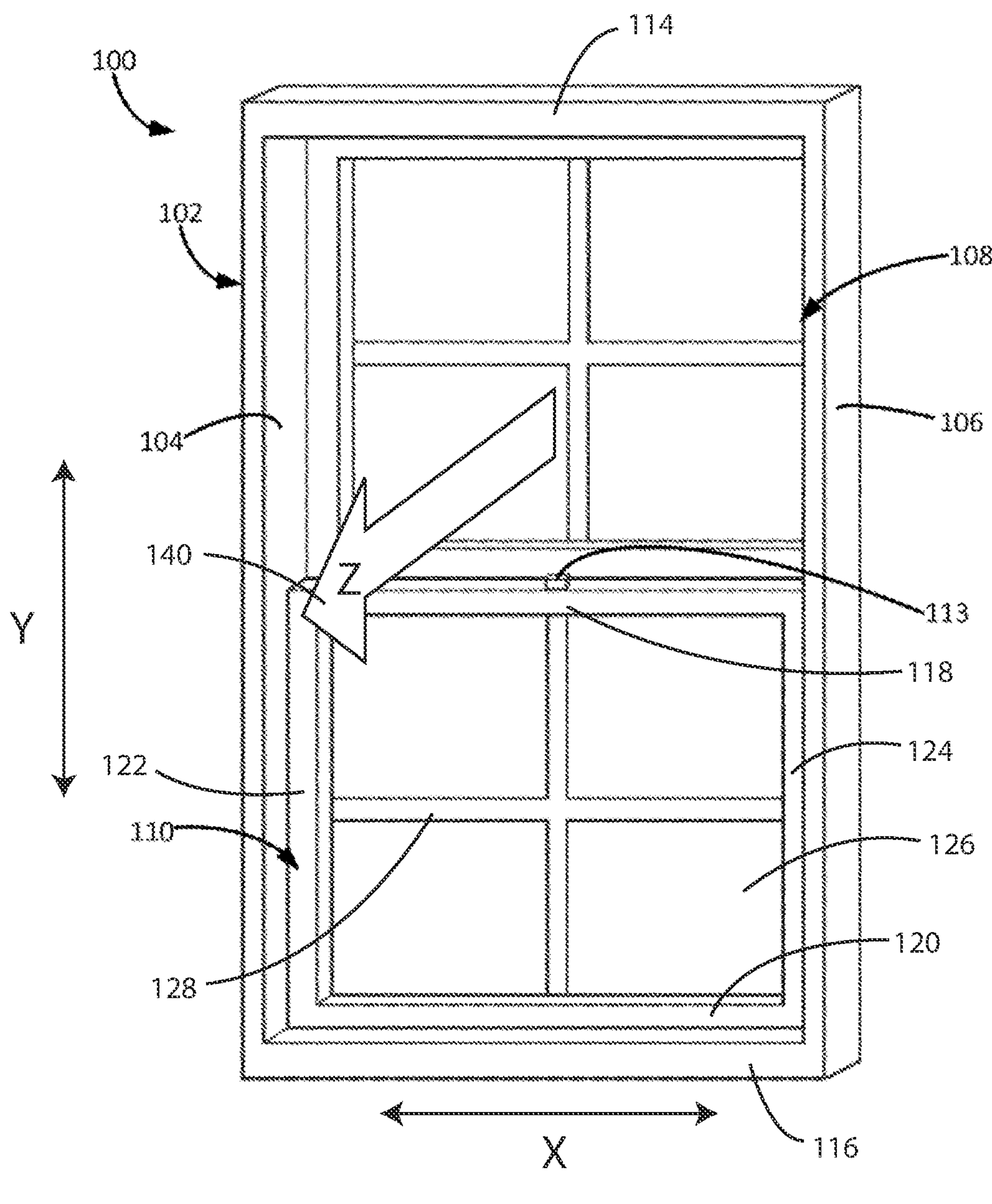
FIG. 1 is a schematic illustration of a fenestration unit in accordance with various embodiments herein.

Exemplary building components included herein can specifically include fenestration units. Referring now to FIG. 1, a schematic illustration is shown of a fenestration unit 100 in accordance with various embodiments herein. The fenestration unit 100 includes a window frame 102 including a first jamb 104 on one side and a second jamb 106 on the opposite side of the frame 102. The window frame also includes a head 114 and a sill 116. The frame 102 defines a frame opening. A first sash 108 and a second sash 110 are mounted within the frame opening of the frame 102 and, in some embodiments, at least one of the first sash 108 and second sash 110 can move vertically within the frame 102 between an open position and a closed position. The fenestration unit can include a sash lock mechanism 113. The frame 102, or portions thereof, can be formed from an extruded article such as those described herein that can be cut to size and fit together.

The sash 110 can include an upper rail 118, a lower rail 120, a first stile 122, and a second stile 124. The sashes can also include a glazing unit 126, such as an insulating glazing unit, between the rails and the stiles. In some embodiments, a grille 128 can be disposed over the glazing unit 126. In some embodiments, a check rail can be disposed where the first sash 108 and the second sash 110 meet when they are in a closed position. The sashes, or portions thereof, including but not limited to the rails, stiles, grille and the like, can be formed from an extruded article such as those described herein that can be cut to size and, in some cases, fit together.

The fenestration unit 100 must be strong enough to hold all of the components together under normal use conditions. However, the fenestration unit 100 must also be strong enough to withstand forces such as those caused by wind loading. The direction of dominant wind loading forces is indicated in FIG. 1 by arrow 140, idealized in direction as coming straight into the fenestration unit 100 on the Z axis. For purposes of reference, the side or sides of components closest to the incoming wind loading force can be referred to as an exterior side or sides while the opposite side or sides can be referred to an interior side or sides. As such, in some cases, wall members closest to the exterior side can be referred to as "exterior walls" and wall members closest to the interior side can be referred to as "interior walls". However, it will be appreciated that walls of embodiments herein can also simply be referred to as a first wall, second wall, third wall, fourth wall, and so on. Wall members can be structures that enclose or divide an area, in some cases with a width or a length substantially larger than a thickness thereof, such as 2, 3, 4, 5, 6, 7, 8, 9, 10, 15, 20, 25, 30 or 40 times larger. A "wall member" can be a specific example of a type of "body member" or a portion of a "body member" herein.

As used herein, the term "external" is not the same as the term "exterior". Rather, the term "external", such as in "external wall" shall refer to elements that are on the outside of the extruded article itself. Similarly, the term "internal" is not the same as "interior". Rather, the term "internal", such as in "internal wall" shall refer to elements that are on the inside of the extruded article itself.

While many different pieces/segments of an exemplary fenestration unit are shown with reference to FIG. 1, it will be appreciated that many other components can also be a part of fenestration units including, but not limited to, mullions, muntins, jamb liners, casings, stools, aprons, casements, transoms, trim packages, and the like. Such components, or portions thereof, can be formed from an extruded article such as those described herein that can be cut to size and, in some cases, fit together.

While FIG. 1 shows a double-hung window assembly as one example of a fenestration unit, it will be appreciated that there are many other types of fenestrations units within the scope herein. By way of example, fenestration units can include double-hung windows, casement windows, awning windows, hopper windows, picture windows, transom windows, slider windows, stationary windows, bay windows, roof windows (horizontal or vertical installations) and the like. Fenestration units can also include doors such as patio doors, French doors, storm doors, exterior and interior doors, overhead garage doors, trims/overlays for any type of door, and the like.

Exemplary building components included herein can also include items other than fenestration units. By way of example, exemplary building components herein can include both structural and decorative members, including, but not limited to, those used in railings, decking, siding, flooring, fencing, trim and other building products. Other specific building components can include grid, cove, bead, quarter round, capstock or capping layers, and the like. Other components herein can also include extenders, panels and the like. In some embodiments, a rigid structural member is included. In some embodiments, the rigid structural member can be used as an insert placed within an extruded profile hollow during assembly for additional structural performance. Other components within the scope herein can include framing, panel framing, lineals in other building components not previously mentioned, and the like.

Figure 2:
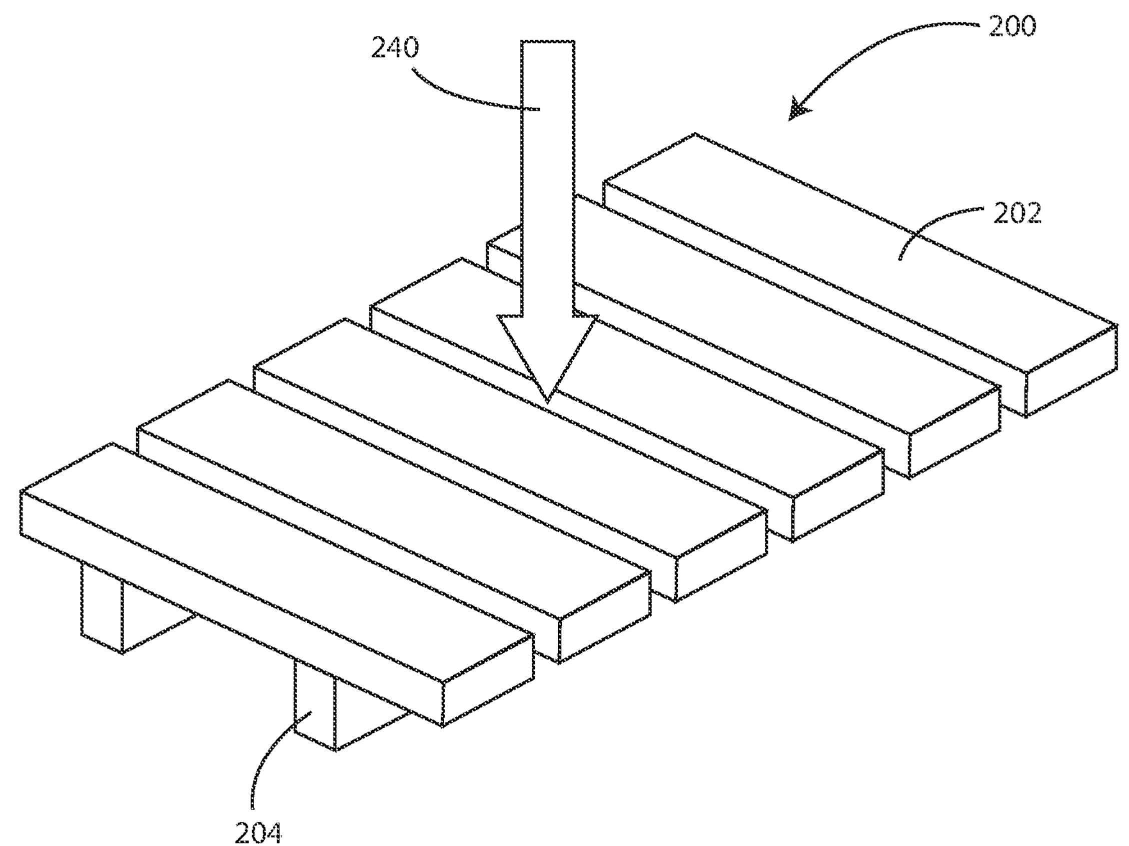
FIG. 2 is a schematic illustration of a decking structure in accordance with various embodiments herein.

Referring now to FIG. 2, a schematic illustration is shown of a portion of a deck structure 200 in accordance with various embodiments herein. The deck structure 200 includes a plurality of decking boards 202 supported by joists 204. The decking boards 202 and/or the joists 204, or portions thereof, can be or can include an extruded article such as those described herein. As such, the decking boards 202 and/or the joists 204 can include, in whole or in part, advanced composite materials such as those described herein for enhanced properties. The direction of dominant force caused by gravity is indicated in FIG. 2 by arrow 240. For purposes of reference, the sides of components closest to the incoming gravitation force load can be referred to as the exterior side while the opposite sides can be referred to as the interior sides.

Various other components of a deck structure that are not shown can include posts, beams, rails, rail cap, bench seats, treads, risers, stringers, and the like. Such components or portions thereof can be formed from an extruded article such as those described herein that can be cut to size and, in some cases, fit together.

Various portions of extruded articles herein can be formed of advanced composite materials for purposes of enhancing structural properties, aesthetics or energy efficiency. As such, extruded articles herein can have advanced composite materials selectively placed therein so as to maximize desirable properties while minimizing cost. In some embodiments, selective placement can include forming one or more portions of an article, such as an extruded article, with an advanced composite such as those described herein. For example, in some embodiments, at least 5%, 10%, 20%, 30%, 40%, 50%, 60%, 70%, 80%, 90% or 95% by weight of an extruded article can be formed of an advanced composite such as those described herein. In some embodiments, the percentage can be within a range wherein any of the foregoing can serve as the upper or lower bound of the range, provided that the upper bound is greater than the lower bound.

It will be appreciated that various portions of extruded articles herein can be formed through an extrusion process. However, in some embodiments, portions of extruded articles herein can be formed through a pultrusion process, such as all or parts of a body member that forms part of an extruded article.

Selective Placement-Walls

In some embodiments, selective placement can include forming one or more walls within an article, such as an extruded article, with an advanced composite such as those describe herein.

In some embodiments, selective placement can include replacing one or more portions of one or more walls within an article, such as an extruded article, with an advanced composite such as those describe herein. For example, in some embodiments, at least 5%, 10%, 20%, 30%, 40%, 50%, 60%, 70%, 80%, 90% or 95% by weight of one or more walls can be formed of an advanced composite such as those described herein. In some embodiments, the percentage can be within a range wherein any of the foregoing can serve as the upper or lower bound of the range, provided that the upper bound is greater than the lower bound.

Figures 3, 4:
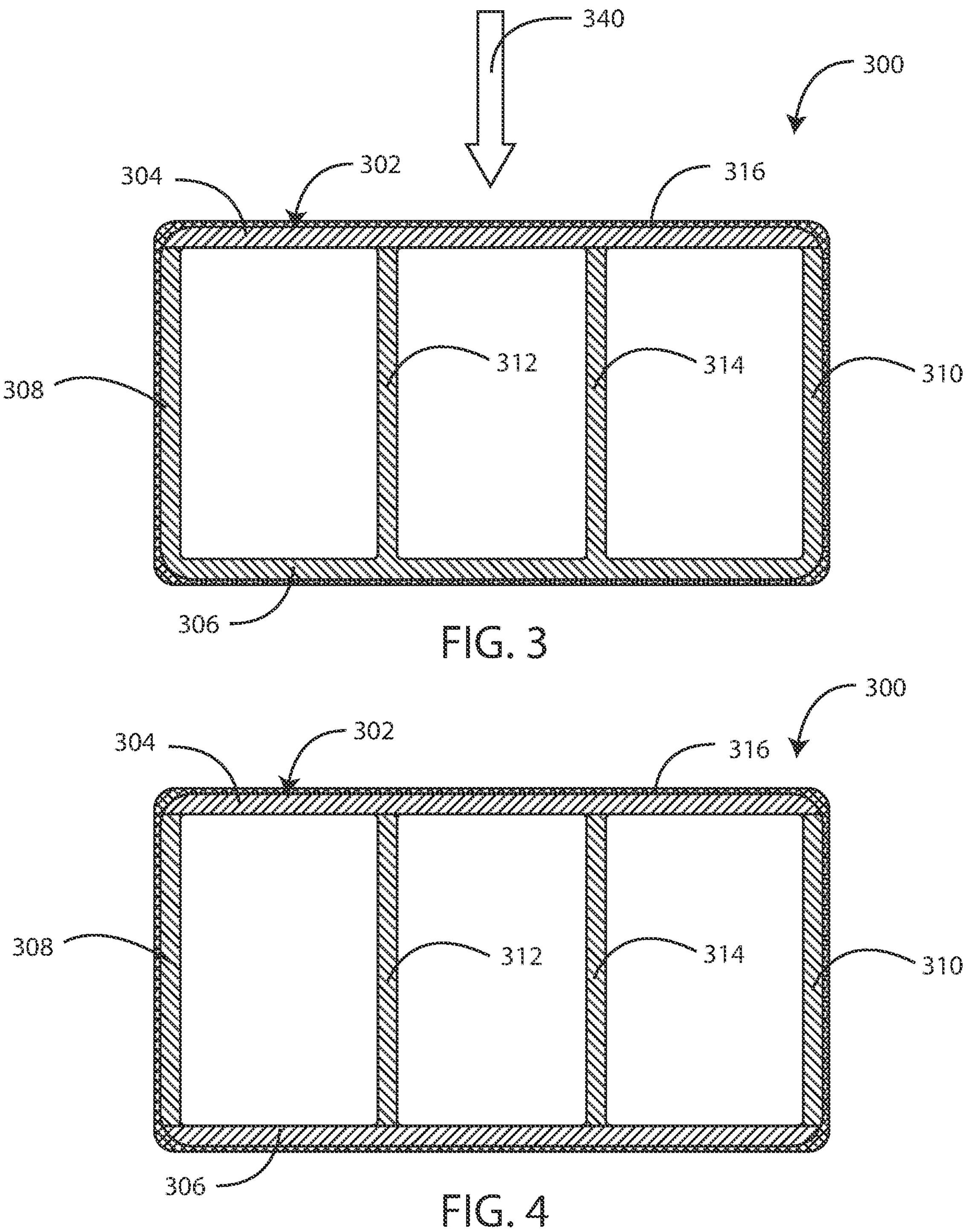
FIG. 3 is a cross-sectional view of an extruded article in accordance with various embodiments herein.
FIG. 4 is a cross-sectional view of an extruded article in accordance with various embodiments herein.

Referring now to FIG. 3, a cross-sectional view of an extruded article 300 in accordance with various embodiments herein is shown. The extruded article 300 includes a body member 302 (such as an extruded body member) and a capstock layer 316 disposed over the extruded body member 302. The capstock layer 316 can be coextruded with the extruded body member 302.

The extruded body member 302 can include external wall members and, in some embodiments, one or more internal wall members. In this view, external wall members include an exterior wall 304 and an interior wall 306 disposed opposite the exterior wall 304. The external wall members further include a first lateral wall 308 and a second lateral wall 310 disposed opposite the first lateral wall 308. In this view, internal wall members include a first internal wall 312 and a second internal wall member 314. In this embodiment, both of the internal walls 312, 314 are oriented to be parallel with the first lateral wall 308 and second lateral wall 310. However, it will be appreciated that the internal walls can be in various other orientations as well, such as perpendicular, or at given angle to other walls such as the lateral walls. In addition, the external walls can be disposed toward one another at angles other than the specific angles shown.

Wall thickness can vary substantially depending on the nature of the extruded article, the loads which the extruded article must support, the geometry of the walls, etc. However, in various embodiments, the average wall thickness of external walls can be from about 0.040" to 0.40" (1.016 mm to 10.16 mm) or from 0.070" to 0.250" (1.778 mm to 6.35 mm). Internal walls can be the same average thickness as external walls, or in some cases thinner or thicker. In various embodiments, the average wall thickness of internal walls can be from about 0.025" to 0.40" (0.635 mm to 10.16 mm) or from 0.050" to 0.250" (1.27 mm to 6.35 mm).

An advanced composite material can be used selectively to form all or portions of one or more of the walls of the extruded body member 302, including all or portions of the exterior wall 304, interior wall 306, first lateral wall 308, second lateral wall 310, and internal walls 312, 314. The remainder can be formed of a different material. The different material can, in some cases, include a similar composition that includes some of the same components as the advanced composite, such as the same polymeric resin, but that lacks all of the components of the advanced composite. In some cases, the different material can be something entirely different including a different polymeric resin. Regardless, in some embodiments, the extruded body member 302 can include a first portion formed of a first composition and a second portion formed of a second composition. In some embodiments, the extruded body member 302 can further include a third portion formed of a third composition, different than the first or second compositions. In some embodiments, the extruded body member 302 can further include a fourth portion formed of a fourth composition, different than the first, second and third compositions. In some embodiments, the extruded body member 302 can further include a fifth portion formed of a fifth composition, different than the first, second, third and fourth compositions. In some embodiments, the extruded body member 302 can further include a sixth portion formed of a sixth composition, different than the first, second, third, fourth and fifth compositions. In some embodiments, the extruded body member 302 can further include a seventh portion formed of a seventh composition, different than the first, second, third, fourth, fifth and sixth compositions. In some embodiments, the extruded body member 302 can further include an eighth portion formed of a eighth composition, different than the first, second, third, fourth, fifth, sixth, and seventh compositions.

With reference to FIG. 3 and also further embodiments described below, the second composition can be an advanced composite material. The first composition can include various things. For example, the first composition can be a non-composite polymeric material including, as a polymer resin, any of the polymers described below. In some embodiments, the first composition can be a composite material, such as a polymer resin including any of those described below and particles, such as wood particles for example. In some embodiments, the first composition can also be an advanced composite material herein, but with a different formulation than the second composition.

Aspects of exemplary compositions forming the advanced composite material are described in greater detail below. However, in some embodiments the advanced composite material can include a polymer resin, fibers, and at least one component selected from the group consisting of at least 1% by weight particles and at least 5 phr (parts per hundred resin) impact modifier.

With reference to FIG. 3, the first portion made of a first composition includes interior wall 306, first lateral wall 308, second lateral wall 310, and internal walls 312, 314, while the second portion made of a second composition includes the exterior wall 304. The capstock layer 316 can be formed of a third composition, which can be various materials, and can be different than the first composition and the second composition. In some embodiments, the capstock layer 316 can include a vinyl material, such as a polyvinyl chloride composition, pigmented or unpigmented, and formulated as a composite or non-composite. In some embodiments, the capstock layer 316 can include an acrylic material. In some embodiments, such as shown below, the capstock layer 316 itself can be formed of an advanced composite herein.

The capstock layer 316 thickness can vary. However, in various embodiments, the average capstock layer 316 thickness (in areas other than where the capstock material is used to form a specific structural feature) can be from about 0.002" to 0.10" (0.0508 mm to 2.54 mm) or about 0.005" to 0.050" (0.127 mm to 1.27 mm).

While FIG. 3 shows just the exterior wall formed of the advanced composite material, it will appreciated that in other embodiments the configuration can be reversed such that only the interior wall is formed of the advanced composite material. Similarly, in some embodiments only the external walls are formed of the advanced composite material and in other embodiments only the internal walls are formed for the advance composite material. Many different combinations are contemplated herein.

It will be appreciated that many different parts of extruded articles herein can be formed from the advanced composite material. Referring now to FIG. 4, a cross-sectional view is shown of an extruded article in accordance with various embodiments herein. In this example, the first lateral wall 308, second lateral wall 310, and internal walls 312, 314 are formed from a first composition while the exterior wall 304 and interior wall 306 are formed of a second composition. In this example, the second composition can be an advanced composite as described in greater detail below, while the first composition can be a different polymeric composition.

Figure 5:
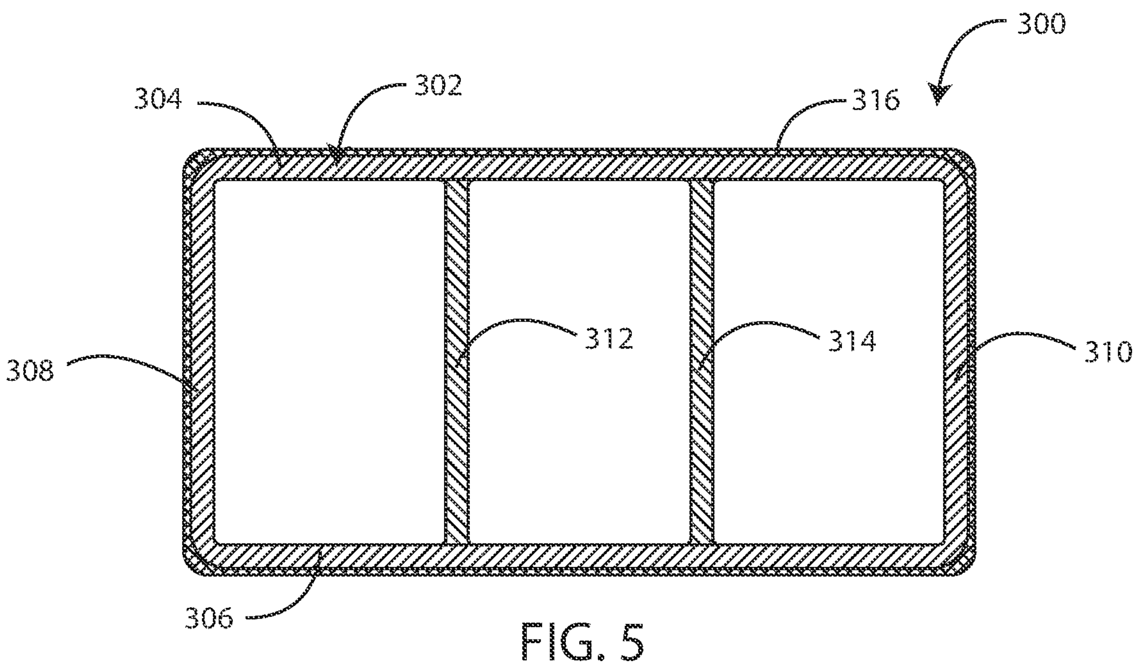
FIG. 5 is a cross-sectional view of an extruded article in accordance with various embodiments herein.

Referring now to FIG. 5, a cross-sectional view is shown of another extruded article 300 in accordance with various embodiments herein. In this example, the exterior wall 304, interior wall 306, first lateral wall 308, and second lateral wall 310 are formed from a first composition while internal walls 312, 314 are formed of a second composition. The second composition can be an advanced composite as described in greater detail below.

Figure 6:
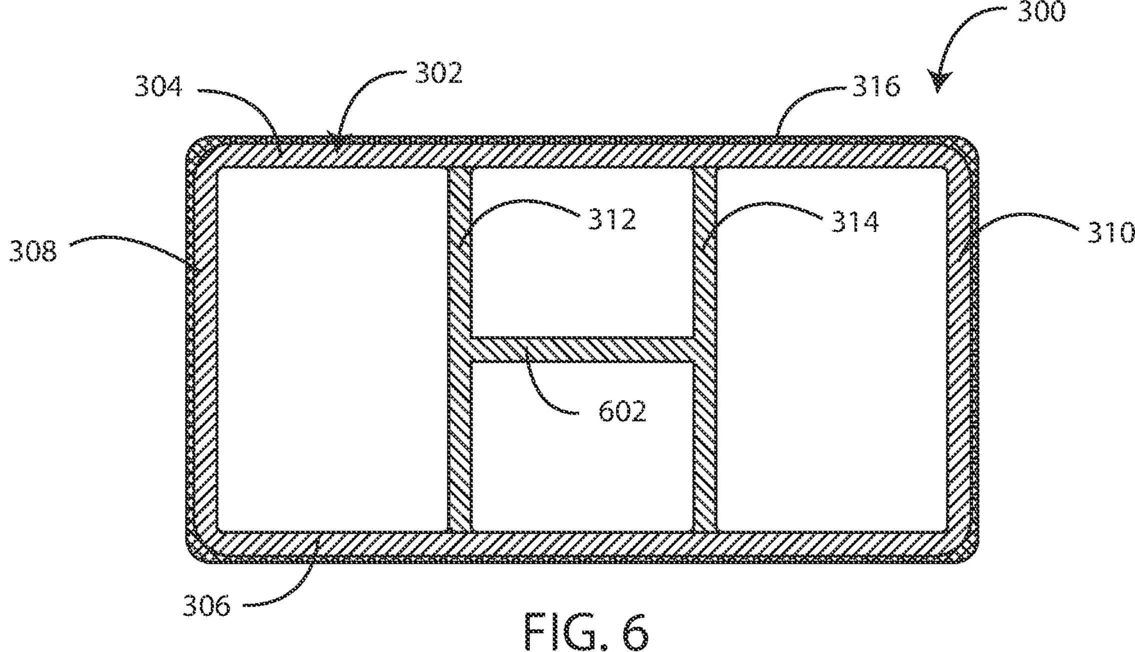
FIG. 6 is a cross-sectional view of an extruded article in accordance with various embodiments herein.

As referenced above, internal walls can take on many different forms and orientations. Referring now to FIG. 6, a cross-sectional view of an extruded article 300 is shown in accordance with various embodiments herein. The extruded body member 302 includes exterior wall 304, interior wall 306, first lateral wall 308, second lateral wall 310, and internal walls 312, 314. In addition, the extruded body member 302 includes internal cross-wall 602 connected to internal walls 312, 314 and arranged perpendicularly to them. In this example, the exterior wall 304, interior wall 306, first lateral wall 308, and second lateral wall 310 are formed from a first composition while internal walls 312, 314 and internal cross-wall 602 are formed of a second composition, wherein the second composition can be an advanced composite as described in greater detail below.

Figures 7, 8:
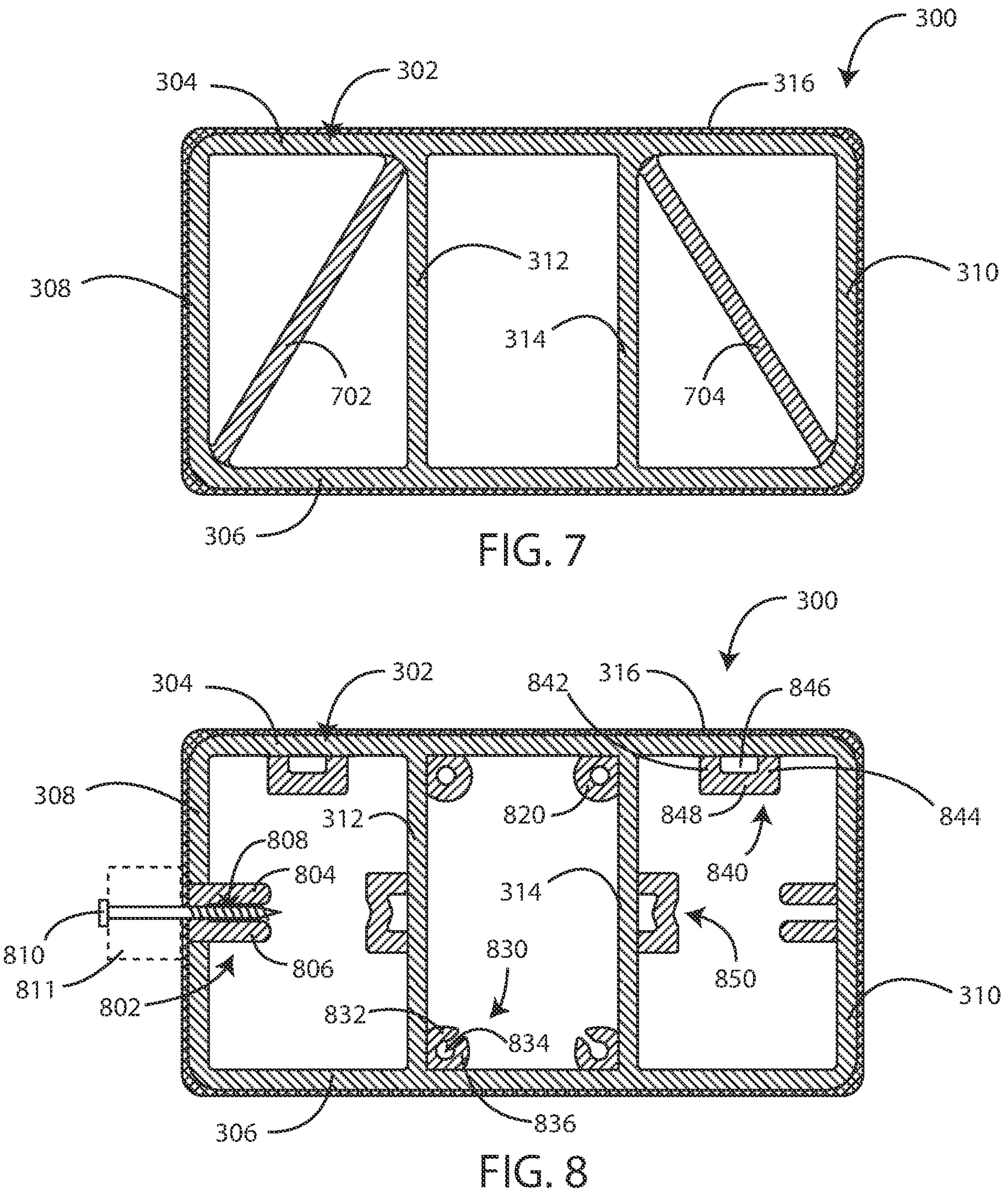
FIG. 7 is a cross-sectional view of an extruded article in accordance with various embodiments herein.
FIG. 8 is a cross-sectional view of an extruded article in accordance with various embodiments herein.

It will be appreciated that not all of the walls are arranged at right angles to one another. Rather, walls (including both external and internal walls) can be disposed at various angles to one another. Referring now to FIG. 7, a cross-sectional view of an extruded article 300 is shown in accordance with various embodiments herein. The extruded body member 302 includes exterior wall 304, interior wall 306, first lateral wall 308, second lateral wall 310, and internal walls 312, 314. In addition, the extruded body member 302 includes internal support walls 702, 704. Support walls 702, 704 are arranged at an angle with respect to the other walls of the extruded article 300, in this case at approximately a 45 degree angle with respect to one or more of the exterior wall 304, interior wall 306, first lateral wall 308, second lateral wall 310, and internal walls 312, 314. Other angles are contemplated herein such as about 5, 10, 15, 20, 30, 40, 45, 60, 70, 75, 80, or 85 degrees, or falling within a range between any of those.

Fastener Ports

Extruded articles herein can have various functional structures, including but not limited to fastener ports (such as screw chases or screw ports), flanges (such as fastener or nailing flanges), connection structures (such as snap-fit mechanisms), and the like. Those functional components can be advantageously formed, in whole or in part, from advanced composite materials such as those described herein.

Fastener ports are one example of a functional structure and can serve various purposes. Fastener ports can act as a guide during fastener insertion in order to make straight fastener insertion, or insertion at a particular angle, easier. During insertion, portions of the fastener can make contact with walls forming the fastener port, physically guiding insertion of the fastener. In addition, fastener ports can be configured to engage with elements of the fastener, such as threads on a screw or surface features on a staple or nail, in order to provide solid fixation of the fastener. For example, threads on a screw can sink into walls of a fastener port. However, not all materials are ideally suited for use in forming a fastener port. Some materials are prone to cracking, which can lead to weakening and/or breakage and are therefore not ideal. Other materials do not provide a desired level of fixation. In addition, some materials simply cannot be formed into specific geometries, thereby limiting possible geometries for fastener ports.

However, embodiments herein include extruded articles with fastener ports in which all or portions of the walls forming the fastener port are formed of an advanced composite material that provides resistance to crack propagation and a desirably high level of fastener retention.

As an example, referring now to FIG. 8, a cross-sectional view of an extruded article 300 is shown in accordance with various embodiments herein. The extruded article 300 includes a body member 302 (such as an extruded body member) and a capstock layer 316 disposed over the extruded body member 302. The capstock layer 316 can be coextruded with the extruded body member 302. The extruded body member 302 can include external wall members and, in some embodiments, internal wall member. In this view, external wall members include an exterior wall 304 and an interior wall 306 disposed opposite the exterior wall 304. The external wall members further include a first lateral wall 308 and a second lateral wall 310 disposed opposite the first lateral wall 308. In this view, internal wall members include a first internal wall 312 and a second internal wall member 314.

The extruded article 300 also includes various fastener ports. It will be appreciated that fastener ports can take on many different specific configurations. This schematic view has been created to illustrate a few different types of fastener port configurations. As one specific example, the extruded article 300 can include fastener port 802. Fastener port 802 can include a first internal stub wall 804 (or first internal partial wall) and a second internal stub wall 806 (or second internal partial wall) opposite the first internal stub wall 804. The first internal stub wall 804 and the second internal stub wall 806 can be formed of an advanced composite material such as those described herein. As shown, the first internal stub wall 804 and the second internal stub wall 806 can be formed of a different material than surrounding portions of the first lateral wall 308. The two opposed internal stub walls 804, 806 are separated by and define a channel 808 disposed between the opposed stub walls 804, 806. The channel 808 can have a width between the two opposed internal stub walls 804, 806 of about 2 mm to about 25 mm. This distance can be adjusted based on the size of the desired fastener. A fastener 810 can be inserted into the extruded article 300 and come to rest in the channel 808 and engage with the two opposed internal stub walls 804, 806. In this case, the fastener is shown entering the extruded article 300 from the side. However, it will be appreciated that the fastener could also enter the extruded article along an axis going directly into the page and still come to rest similarly in the channel 808 engaging the opposed internal stub walls 804, 806.

In this example, the fastener port 802 includes stub walls 804, 806 that are substantially straight and do not touch each other at the ends farthest way from their base. However, it will be appreciated that many different configurations are possible. As another example, fastener port 830 includes a two opposed internal stub walls 832, 836 that are curved and define a channel 834 disposed between the two opposed internal stub walls 832, 836. In this example, the two opposed internal stub walls 832, 836 can be formed of an advanced composite material herein and adjacent portions of the interior wall 306, first internal wall 312 and second internal wall member 314 can be formed of a different material. As yet another example, fastener port 820 includes stub walls (which can be thought of as two opposed walls that contact each other or as a single integrated wall) that fully surround a channel. Therefore, in some embodiments, the channel of the fastener port is fully surrounded by walls and in other embodiments the channel of the fastener port includes one or more gaps and is not fully surrounded by walls.

In yet another example, fastener port 840 includes two opposed internal stub walls 842, 844 along with a connecting segment 848 arranged at a different angle than the stub walls 842, 844 and serving to connect the two stub walls 842, 844 together. In this case, the two opposed internal stub walls 842, 844 and the connecting segment 848 together define the channel 846. In addition, in this example, the exterior wall 304 also defines part of the channel 846 of the fastener port 840. In this example, the two opposed internal stub walls 842, 844 and the connecting segment 848 can be formed of an advanced composite material such as those described herein and the exterior wall 304 can be formed of a different material. However, in some embodiments, portions of the exterior wall 304 (and/or other walls forming parts of other fastener ports) can be formed of the advanced composite material as well. Similar to this example, in various embodiments, any of the external or internal walls can potentially form part of a fastener port.

The fastener ports can take on many different shapes. In some embodiments, the walls defining the fastener port (internal, external, stub, connecting, etc.) can include a portion that is concave or convex with respect to the channel of the fastener port. By way of example, the connection segment of fastener port 850 is bowed inward.

Thermal Breaks

Intersegment displacement of one material for another can be performed for various reasons including, but not limited to, thermal properties, reduced moisture uptake, aesthetic properties and the like.

As one example, advanced composites herein can exhibit desirable thermal properties. In particular, advanced composites herein can exhibit desirable heat transfer properties. A table of heat transfer coefficients for some compositions including advanced composite materials herein is shown in Table 1 below.

TABLE 1

| Material Property | Exemplary Advanced Composite PVC, 15 wt. % glass fiber, 5 wt. % wood particles; 10 phr impact modifier) | Extruded Polymeric Composite (Vinyl/40 wt. % Wood) | Extruded Polymer (Non-Composite) (PVC) |
|---|---|---|---|
| Thermal Conductivity | .19 W/mK | .21 W/mK | .17 W/mK |

A thermal break is a portion of an extruded article that inhibits the flow of heat or otherwise alters the flow of heat from one portion of the extruded article to another. By way of example, thermal breaks can be useful in conjunction with fenestration units when positioned in order to reduce the flow of heat from the exterior side to the interior side and vice versa.

Figure 9A:
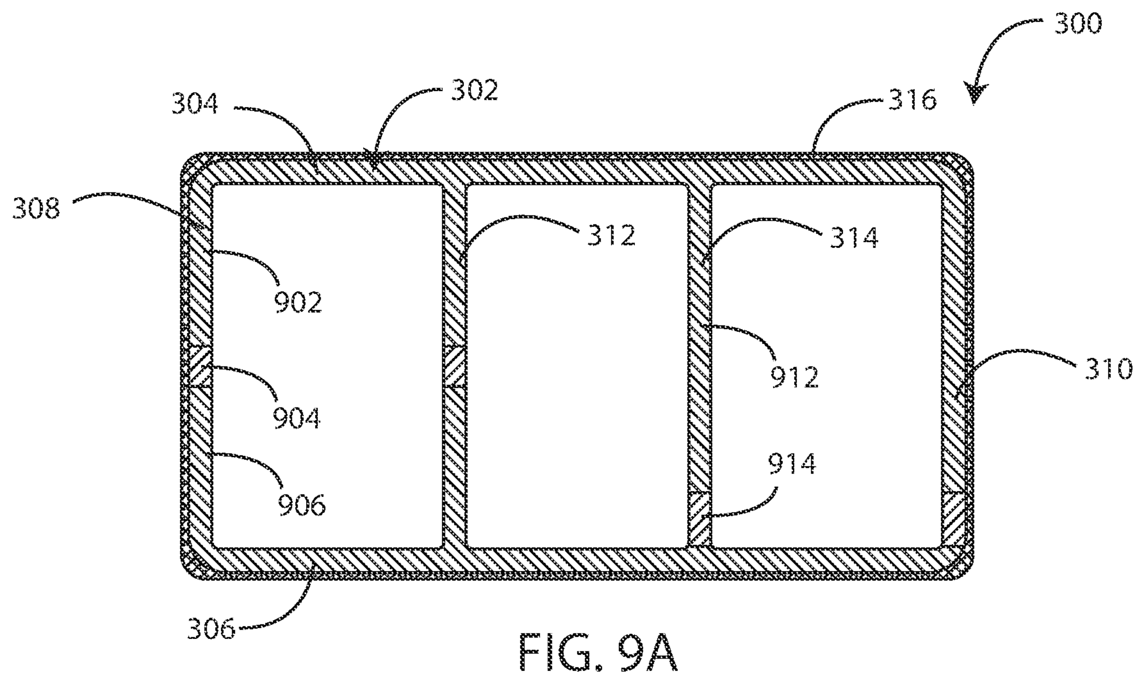
FIG. 9A is a cross-sectional view of an extruded article in accordance with various embodiments herein.

Referring now to FIG. 9A, a cross-sectional view of an extruded article 300 is shown in accordance with various embodiments herein. The extruded article 300 includes a body member 302 and a capstock layer 316 disposed over the extruded body member 302. The extruded body member 302 can include external wall members and, in some embodiments, internal wall members. In this view, external wall members include an exterior wall 304 and an interior wall 306 disposed opposite the exterior wall 304. The external wall members further include a first lateral wall 308 and a second lateral wall 310 disposed opposite the first lateral wall 308. In this view, internal wall members include a first internal wall 312 and a second internal wall member 314. In this embodiment, both of the internal walls 312, 314 are oriented to be parallel with the first lateral wall 308 and second lateral wall 310.

One or more of the walls can include a segment formed of a material with desirable heat transfer properties in order to function as a thermal break. In some embodiments, the material segment can be at least about 1 mm, 2 mm, 5 mm, 10 mm, 15 mm, 20 mm, 25 mm, 30 mm, 40 mm, 50 mm or 100 mm. In some embodiments, the material segment can have a length falling within a range between any of the foregoing lengths. For example, the first lateral wall 308 can include a portion 904 that is formed of a material exhibiting desirable heat transfer properties and surrounding portions 902, 906 that may have less desirable heat transfer properties, but may have other desirable properties (strength, cost, etc.), It will be appreciated that the portion serving as the thermal break can be disposed in different positions with respect to the extruded article 300. In some embodiments, the thermal break can be disposed near a midpoint between the exterior wall 304 and the interior wall 306. In other embodiments, the thermal break may be disposed closer towards the exterior wall 304 or the interior wall. For example, second internal wall member 314 can include a portion 914 serving as a thermal break adjacent to a non-thermal break portion 912 and the thermal break (and thus portion 914) can be adjacent to or even contacting interior wall 306. Many other specific configurations are contemplated herein.

Extruded Articles without Capstock Layers

Figure 9B:
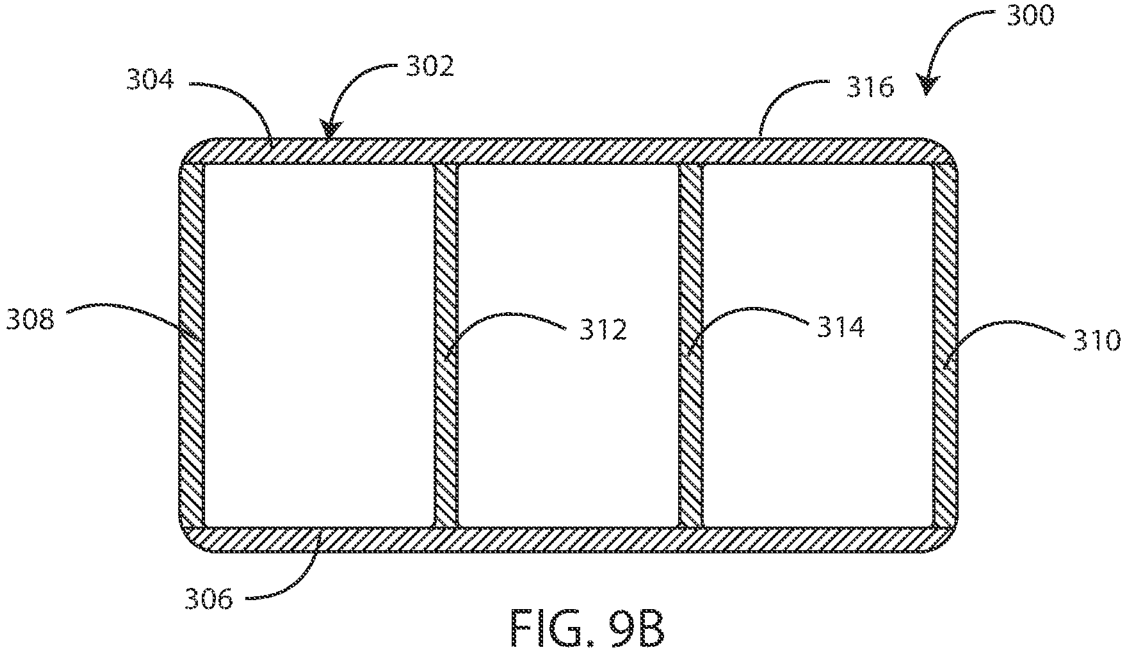
FIG. 9B is a cross-sectional view of an extruded article in accordance with various embodiments herein.

In the examples shown in FIGS. 3-8 and 9A, the extruded articles are all shown with distinct capstock layers. However, it will be appreciated that in some embodiments extruded articles herein may lack capstock layers. In particular, because advanced composites herein have desirably smooth surfaces, a separate capstock layer may not be necessary. Referring now to FIG. 9B, a cross-sectional view of an extruded article 300 is shown in accordance with various embodiments herein. The extruded article 300 includes a body member 302 including exterior wall 304, interior wall 306, first lateral wall 308, second lateral wall 310, first internal wall 312, and second internal wall 314. However, a distinct capstock layer is omitted from this embodiment. The exterior wall 304 and the interior wall 306 can be formed of an advanced composites such as those described in greater detail below. The other walls, such as the first lateral wall 308, second lateral wall 310, first internal wall 312, and second internal wall 314 can be formed of a different composition.

Curved or Bent Extruded Articles

In many cases, extrusion are formed as straight objects by virtue of how the extrusion process works. However, objects which are built using extruded articles are sometimes curved or have curved portions. In some cases, articles can be extruded to have a curved shape or portion. However, in some cases, a need arises to bend straight extruded articles into a curved shape for use in an object such as a fenestration unit or another type of building component.

Bending an extruded article can sometimes lead to the formation of cracks. Such cracks can propagate over time, reducing the structural integrity of the object made using the curved or bent extruded article.

However, advanced composites herein exhibit a heightened resistance to crack propagation and thus they are well-suited for use (in whole or in part) in manufacturing extruded articles that will later be bent to assume curved configurations. Advanced composites herein are also well-suited for extruded articles that directly extruded with a curved shape or portion.

Figure 10:
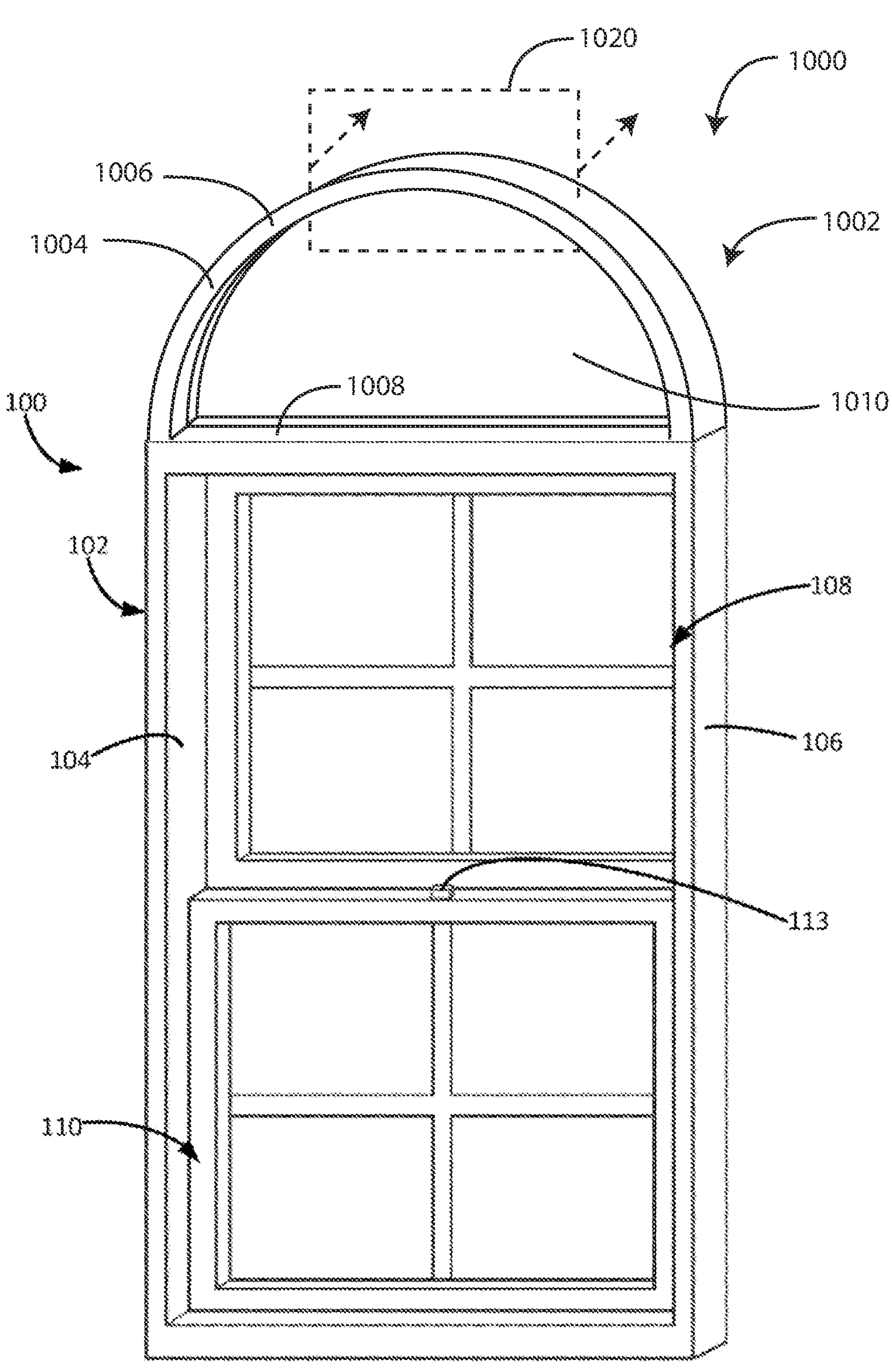
FIG. 10 is a schematic illustration of a fenestration unit in accordance with various embodiments herein.

Referring now to FIG. 10, a schematic illustration is shown of a fenestration unit 1000 in accordance with various embodiments herein. The fenestration unit 1000 is generally similar to the fenestration unit shown in FIG. 1. However, fenestration unit 1000 also includes an arched window 1002. The arched window 1002 includes a frame 1004 including an upper curved frame member 1006 and a lower straight frame member 1008. A glazing unit 1010, such as an insulating glazing unit, is disposed within the frame 1004. The curved frame member 1006 may assume various degrees of curvature. In some embodiments, the curved frame member 1006 can include a radius of curvature of about 6 inches to about 72 inches.

Figure 11:
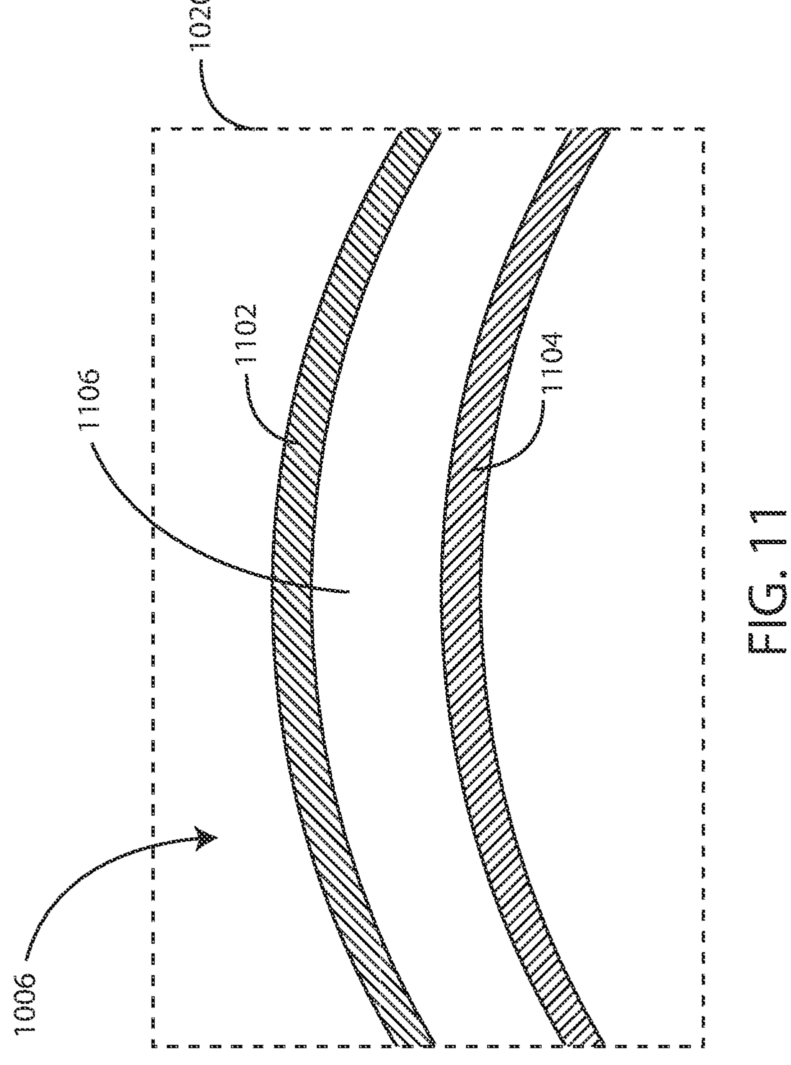
FIG. 11 is a cross-sectional view of a portion of an upper curved frame member of FIG. 10.

FIG. 11 is a cross-sectional view of a portion 1020 of the upper curved frame member 1006 of the fenestration unit shown in FIG. 10. The upper curved frame member 1006 includes an outer radius curved wall 1102 and an inner radius curved wall 1104 interconnected by interior wall 1106. The upper curved frame member 1006 will experience a variety of forces including tensile strain (particularly on upper surfaces) and compression (particularly on lower surfaces). Resistance to crack propagation can be particularly valuable on the outer radius that experiences substantial tensile strain. As such, in various embodiments, the outer radius curved wall 1102 can be formed of an advanced composite that exhibits resistance to crack propagation. For example, the outer radius curved wall 1102 can be formed of a composition comprising a polymer resin, glass fibers and at least one component selected from the group consisting of wood particles and at least 5 phr impact modifier. However, that is merely one example of a suitable advanced composite material. Further aspects of these materials are described in greater detail below. Other portions of the upper curved frame member 1006 (such as other walls or portions thereof) can be formed of the same advanced composite material or from other compositions that can provide other advantages such as being less expensive or exhibiting higher compression strength. As such, in some embodiments the inner radius curved wall 1104 can be formed of a different material than the outer radius curved wall 1102. However, in some embodiments, both the outer radius curved wall 1102 and the inner radius curved wall 1104 are formed of an advanced composite material such as those described herein.

In some embodiments, the upper curved frame member 1006 can also include one or more internal walls, such as those shown in other figures herein. In some embodiments, the internal walls are formed for an advanced composite material such as those described herein while a different composition, including a different composite or non-composite composition is used to form the external walls such as the outer radius curved wall, an inner radius curved wall, exterior wall, and/or interior wall.

Fastener Flanges

As referenced above, extruded articles herein can include various functional components, including amongst other things, flanges (such as fastener or nailing flanges). Flanges on extruded articles herein can be formed, in whole or in part, from advanced composite materials such as those described herein. The resistance to crack propagation exhibited by the advanced composite materials herein can be ideal for use with a flange for various reasons. First, a flange is typically a single-walled component that extends away from the rest of the extruded article much like a fin. As a result, it can be subject to a significant amount of torsion depending on the load applied against the flange. This can lead to crack formation, which if allowed to propagate could lead to structural failure. In addition, flanges, when serving as fastener or nailing flanges, are perforated by fasteners. In many cases, apertures are not formed in the flange prior to fastener insertion. As such, the perforation of the flange creates forces within the flange that can lead to crack formation and, if not controlled, crack propagation and possible structural failure.

Figures 12, 13, 14:
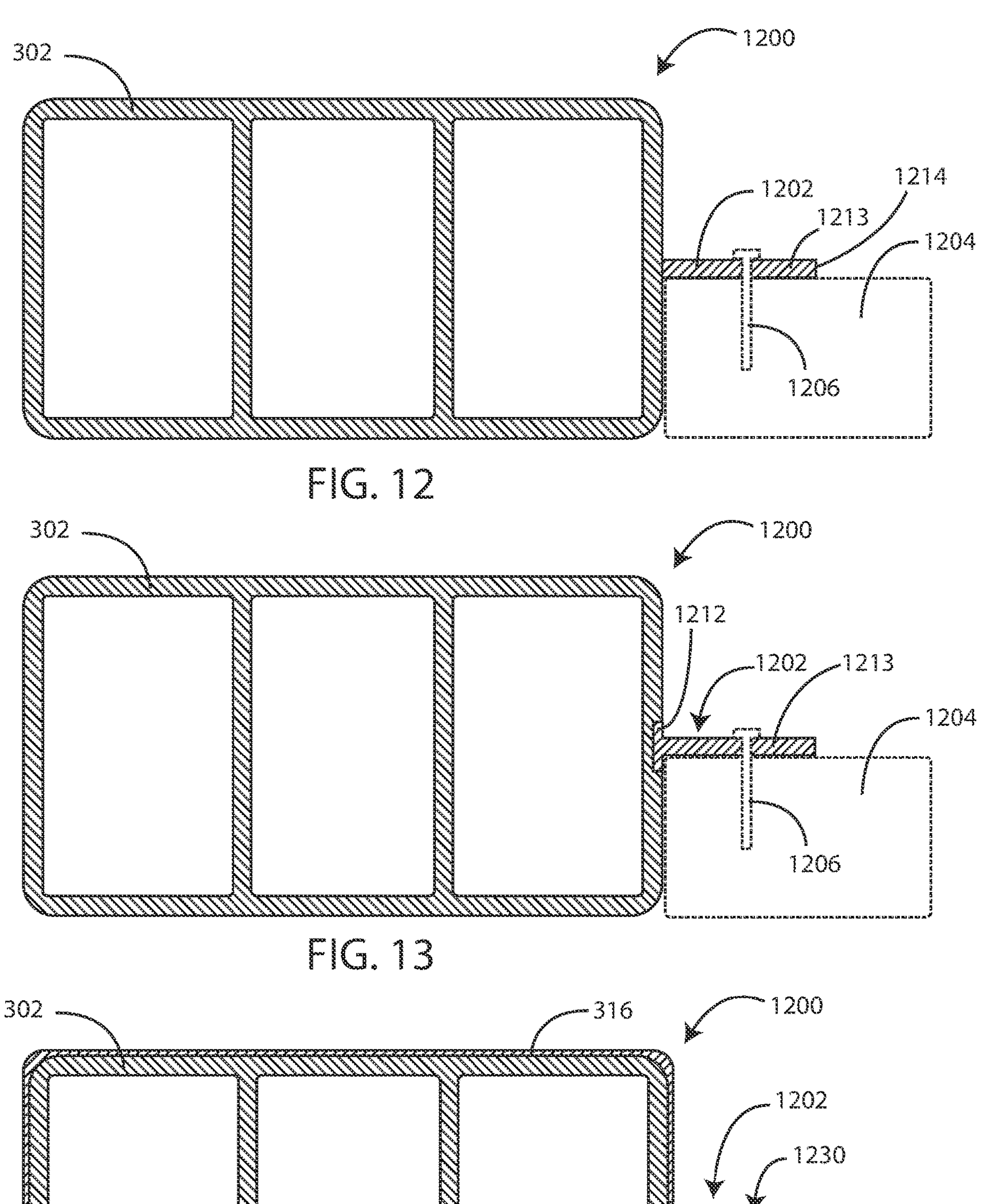
FIG. 12 is a cross-sectional view of an extruded article in accordance with various embodiments herein.
FIG. 13 is a cross-sectional view of an extruded article in accordance with various embodiments herein.
FIG. 14 is a cross-sectional view of an extruded article in accordance with various embodiments herein.

In accordance with various embodiments herein, flanges or portions thereof are formed of advanced composites herein that exhibit a heightened resistance to crack propagation. Referring now to FIG. 12, a cross-sectional view of an extruded article 1200 in accordance with various embodiments herein is shown. The extruded article 1200 includes a body member 302 and flange 1202 extending outward from the extruded body member 302. A fastener 1206 is shown serving to attach the extruded article 1200 to the other object 1204.

In this embodiment, the flange 1202 is a single-wall flange. However, in other embodiments the flange could have two or more walls. The flange 1202 can have a width (extending from the point where it meets the extruded body member 302 out to the tip 1214 of the body portion 1213) of between about 0.5 cm and 10 cm. In various embodiments, the average wall thickness of the flange can be from about 0.015" to 0.40" (0.635 mm to 10.16 mm) or from 0.050" to 0.250" (1.27 mm to 6.35 mm). In some embodiments, the flange 1202 can specifically be a nailing flange.

While the flange 1202 is shown attached to the extruded body member 302 at a middle portion, it will be appreciated that the flange 1202 can be attached to the extruded body member in many different places.

The flange can take on various configurations and shapes. In some embodiments, the flange can include a base portion in order to aid in firm attachment to the extruded body member. Referring now to FIG. 13, a cross-sectional view of an extruded article 1200 is shown in accordance with various embodiments herein. The extruded article 1200 can include a body member 302 and flange 1202 extending outward from the extruded body member 302. The flange 1202 can include a body portion 1213 and a base portion 1212. The base portion 1212 can intersect the body portion 1213 forming a "T" shape. In some embodiments, the base portion 1212 intersects the body portion 1213 at an angle of 45 degrees to 90 degrees, the base portion 1212 having a length of at least 3 mm.

Flanges can include various features. In some embodiments, flanges can include indicia to indicate appropriate positions of fastener insertion. In some embodiments the indicia can be an indentation, a furrow, a bump or the like. In addition, in some embodiments, the flange can be formed of the same material as a capstock layer and can be formed integrally therewith.

Referring now to FIG. 14, a cross-sectional view of an extruded article 1200 is shown in accordance with various embodiments herein. The extruded article 1200 can include a extruded body member 302, a capstock layer 316, and a flange 1202 extending outward from the extruded body member 302 and the capstock layer 316. In this type of embodiment, the capstock layer 316 and the flange 1202 can be formed of the same material, such as an advanced composition material described herein. An indentation can be disposed on a surface of the flange 1202 in order to indicate a proper area for fastener insertion.

Advanced Composites as Capstock Layers

Figures 15, 16, 17:
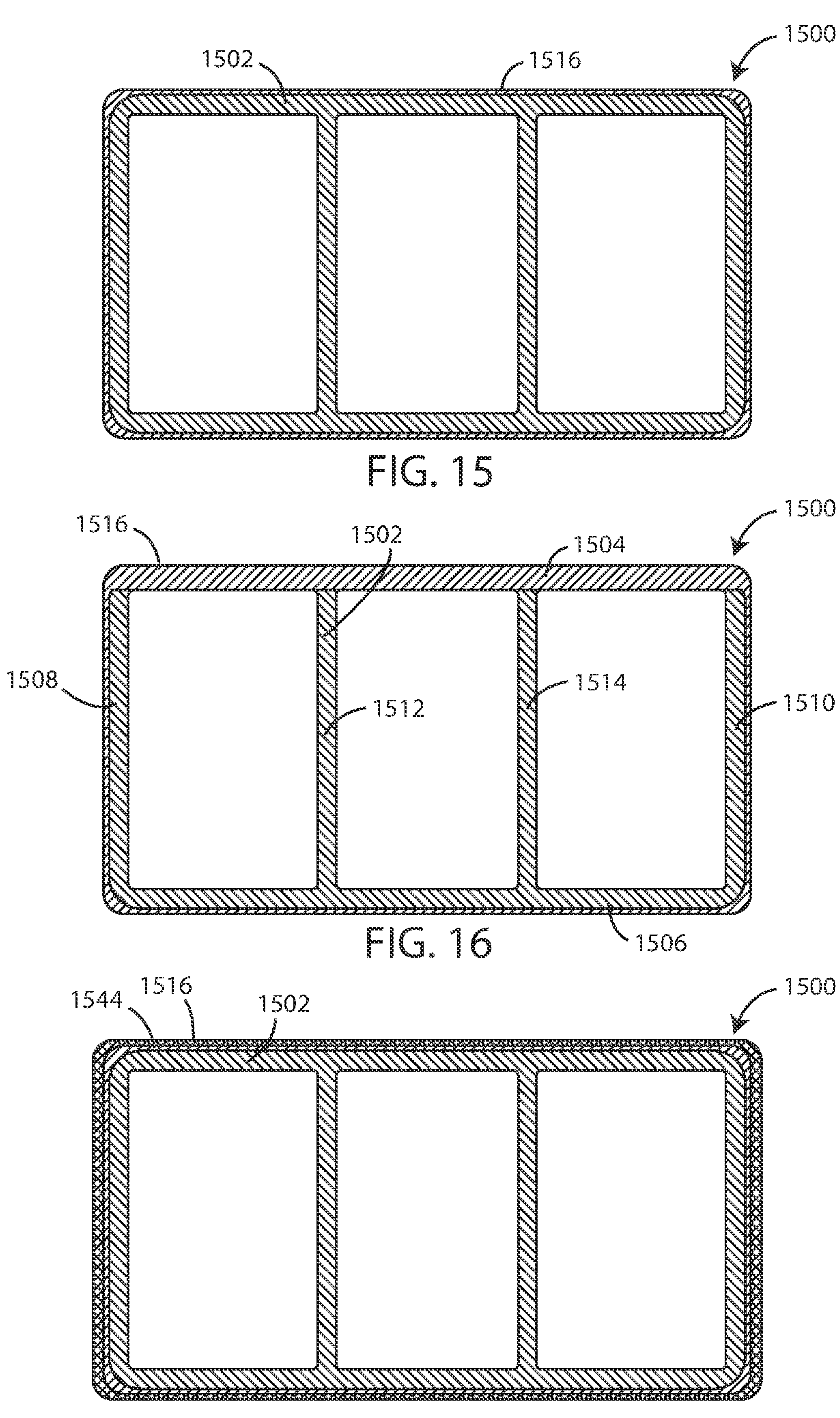
FIG. 15 is a cross-sectional view of an extruded article in accordance with various embodiments herein.
FIG. 16 is a cross-sectional view of an extruded article in accordance with various embodiments herein.
FIG. 17 is a cross-sectional view of an extruded article in accordance with various embodiments herein.

In some embodiments, capstock layers can be formed of advanced composites such as those described in greater detail below. In some embodiments, capstock layers formed of advanced composites can be continuous or discontinuous (including, for example, gaps). Referring now to FIG. 15, a cross-sectional view of an extruded article 1500 is shown in accordance with various embodiments herein. The extruded article 1500 can include a body member 1502 and a capstock layer 1516. The capstock layer 1516 can be formed of an advanced composite material described herein.

Referring now to FIG. 16, a cross-sectional view of an extruded article 1500 is shown in accordance with various embodiments herein. The extruded article 1500 can include a body member 1502 and a capstock layer 1516. The capstock layer 1516 can be formed of an advanced composite material described herein. The extruded body member 1502 can include exterior wall 1504, interior wall 1506, first lateral wall 1508, second lateral wall 1510, first internal wall 1512 and second internal wall 1514. In this example, the exterior wall 1504 is integral with the capstock layer 1516 and is formed of the same materials as the capstock layer. As such, in the area of the exterior wall 1504, the capstock layer 1516 does not form a distinct layer separate from the exterior wall 1504. The other walls are formed of a different composition in this example, although one or more of them could also be formed of the advanced composite material.

In some embodiments, there may be more layers than just the base extruded body member and a capstock layer. For example, one or more intermediate extrusion layers can be included and/or a paint layer can be included. Referring now to FIG. 17, a cross-sectional view of an extruded article 1500 is shown in accordance with various embodiments herein. The extruded article 1500 can include an extruded body member 1502, an intermediate extrusion layer 1544, and a capstock layer 1516. In some embodiments, the capstock layer 1516 can be formed of an advanced composite material described herein. However, in some embodiments, the capstock layer (with reference to FIG. 17 or with reference to any of the other specific embodiments described herein) can be a different composite or non-composite material, such as a non-composite material including one or more of the polymer resins described below. In some embodiments, the intermediate extrusion layer 1544 can be formed of an advanced composite material described herein.

While FIG. 17 shows three layers, it will be appreciated that more than three extrusion layers or different material portions can be included with some embodiments. For example, in some embodiments, four different portions with four different materials can be used. In some embodiments, five different portions with five different materials can be used. In some embodiments, six different portions with six different materials can be used. In some embodiments, seven different portions with seven different materials can be used. In some embodiments, eight different portions with eight different materials can be used.

Complex Profiles and Matched Coefficients of Thermal Expansion

It will be appreciated that embodiments herein are not limited to the relatively simple specific extrusion profiles illustrated and described above. Rather, extruded articles herein can also include those having a much greater degree of complexity.

Selecting materials that have more closely matching coefficients of thermal expansion (COTE) can result in benefits in terms of warping and/or shape deformation. Coefficients of thermal expansion (COTE) ($10^{-5}$ $F^{-1}$) at 70 degrees Fahrenheit for some materials which can form portions of extruded articles herein are shown below in Table 2.

TABLE 2

| Material Property | Exemplary Advanced Composite (PVC-Extrusion Grade; 30 wt. % glass fiber; 10 phr impact modifier) | Exemplary Advanced Composite (PVC-Extrusion Grade, 15 wt. % glass fiber, 5 wt. % wood particles; 10 phr impact modifier) | Extruded Polymeric Composite (PVC-Extrusion Grade/ Wood) | Extruded Polymer (PVC-Extrusion Grade) | Extruded Glass Reinforced PLA (RPLA) (40 wt. % glass, 10 phr, 1% talc) |
|---|---|---|---|---|---|
| COTE ($10^{-5}$ $F^{-1}$) | 0.99 | 1.67 | 1.6 | 4.0 | 1.21 |

While Table 2 above shows exemplary coefficients of thermal expansion for two specific advanced composite formulations herein, it will be appreciated that the full range of possible values for the coefficient of thermal expansion for advanced composite materials herein can vary. In some embodiments, advanced composite materials herein can have a COTE of 0.4, 0.45, 0.5, 0.55, 0.6, 0.65, 0.7, 0.75, 0.8, 0.85, 0.9, 0.95, 1.00, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2.0 ($10^{-5}$ $F^{-1}$). In some embodiments, the COTE of advanced composite materials herein can fall within a range wherein any of the foregoing COTE values can serve as the upper or lower bound of the range, provided that the upper bound is greater than the lower bound. Further references to "PVC" herein can also specifically include R-PVC and U-PVC (unplasticized PVC).

Figure 18:
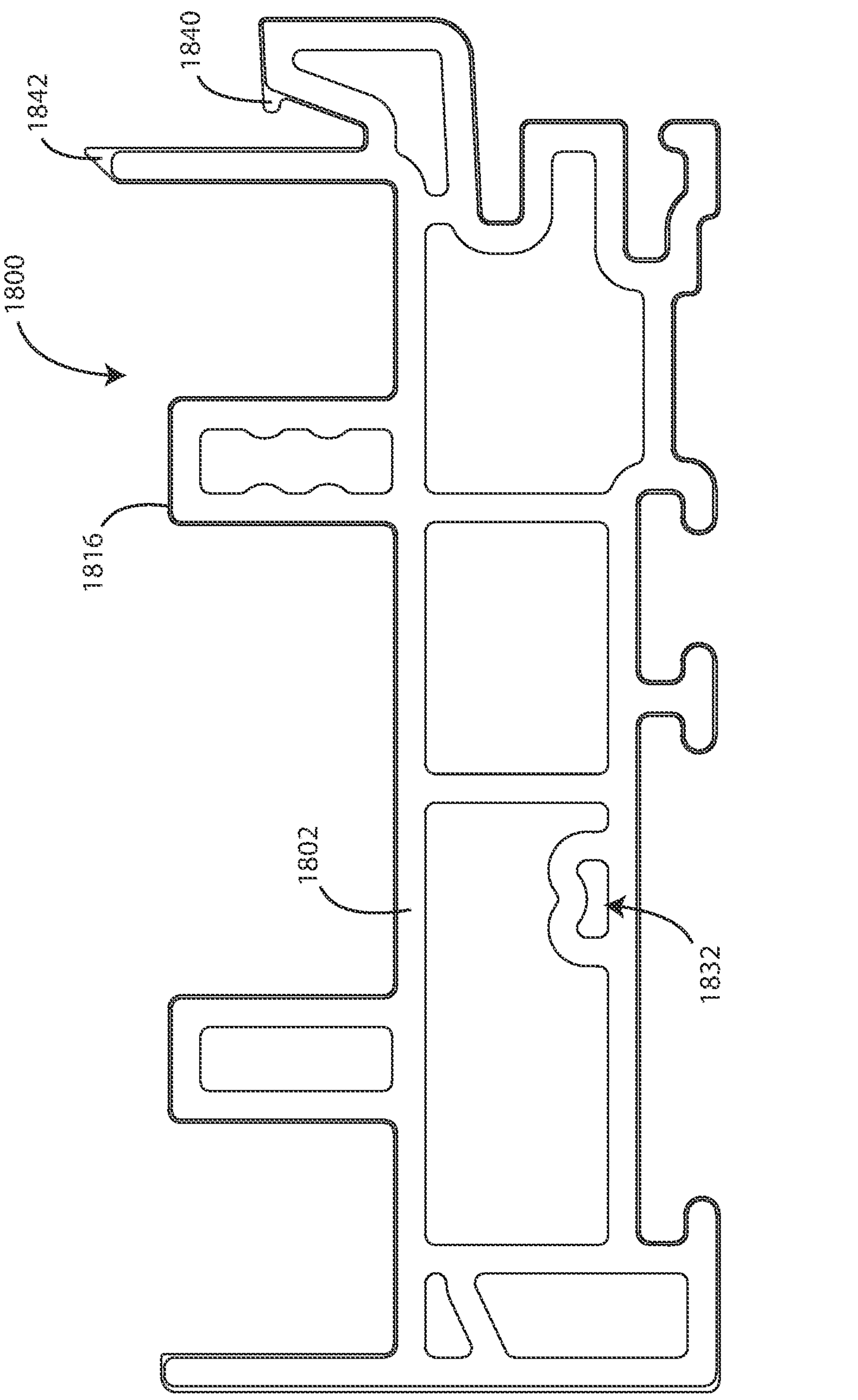
FIG. 18 is a cross-sectional view of an extruded article in accordance with various embodiments herein.

Referring now to FIG. 18, a cross-sectional view of an extruded article 1800 is shown in accordance with various embodiments herein. The extruded article 1800 can include a body member 1802 and a capstock layer 1816. The extruded article 1800 can include various features such as a fastener port 1832, which can be defined by the extruded body member 1802. The capstock layer 1816 can include various features such as engagement feature 1840 and aesthetic portion 1842.

One or more portions of the extruded body member 1802 can be formed of the advanced composite materials herein. One or more portions of the capstock layer 1816 can also be formed of the advanced composite materials herein. However, in some embodiments, the capstock layer 1816 is formed of the advanced composite materials herein, but the extruded body member 1802 is formed of other materials. In some embodiments, one or both of the engagement feature 1840 and aesthetic portion 1842 are formed of the advanced composite material.

The coefficient of thermal expansion of the material for the capstock layer 1816 can be within 2.0, 1.8, 1.6, 1.4, 1.2, 1.0, 0.8, 0.6, 0.4 or 0.2 (10$^{-5}$ $F^{-1}$) of the coefficient of thermal expansion for the material of the extruded body member 1802. In some embodiments, the coefficient of thermal expansion of the material of the capstock layer can be from 0.5 to 2.0 (10$^{-5}$ $F^{-1}$) and the coefficient of thermal expansion of the material of the extruded body member 1802 can also be from 0.5 to 2.0 (10$^{-5}$ $F^{-1}$).

Profiles with Fine Features

Some extrusion designs include fine features for specifics functional reasons and/or for aesthetic reasons. Previous extruded composites created limits on the degree of detail capable of being achieved through an extrusion process. However, advanced composite materials herein are capable of being extruded to form fine features, including both functional and aesthetic fine features.

Figure 19:
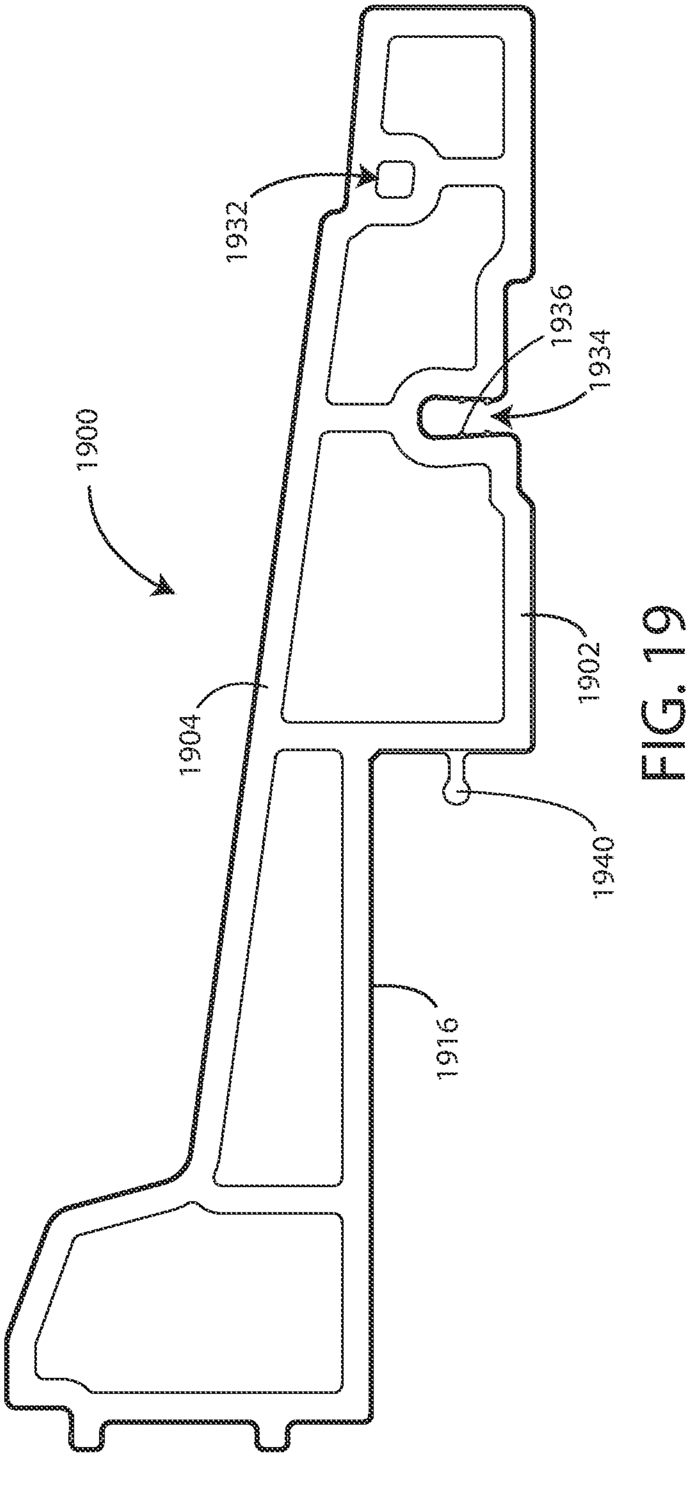
FIG. 19 is a cross-sectional view of an extruded article in accordance with various embodiments herein.

Referring now to FIG. 19, a cross-sectional view of an extruded article 1900 is shown in accordance with various embodiments herein. The extruded article 1900 can include a body member 1902 and a capstock layer 1916. The extruded article 1900 can include various features such as a fastener port 1932, which can be defined by the extruded body member 1902. In some embodiments, the walls (or portions thereof) forming the fastener port 1932 can be formed of the advanced composite material. The capstock layer 1916 can include various features such as kerf 1934, engagement nubs 1936, and engagement bulb or ball 1940.

The engagement nubs 1936 have very small dimensions (e.g., less than 5.0 mm, 3.0 mm, 2.0 mm, 1.0 mm, 0.75 mm, 0.5 mm, 0.25 mm or 0.1 mm) and would, therefore, qualify as fine features in this context. In some embodiments, fine features of the capstock layer 1916, such as the engagement nubs 1936 and other features such as engagement bulb or ball 1940, can be formed of the advanced composite material. In some embodiments fine features herein can include furrows, depressions, bumps, or beads having a depth or height of less than 5.0 mm, 3.0 mm, 2.0 mm, 1.0 mm, 0.75 mm, 0.5 mm, 0.25 mm or 0.1 mm. Other examples of fine features, by reason of their overall size or by reason of the relatively sharp angles that must be achieved, include engagement feature 1840 and aesthetic portion 1842 of FIG. 18. Fine features can also include shallow indentations (including those having a depth of less than 1 mm), small ridges (including those having a height of less than 1 mm) and corners with sharp radius of curvature (including those with a radius of curvature of less than 2 mm, 1.5 mm, 1.0 mm, 0.75 mm, 0.5 mm, or 0.25 mm, or less).

Other Components

Figure 20:
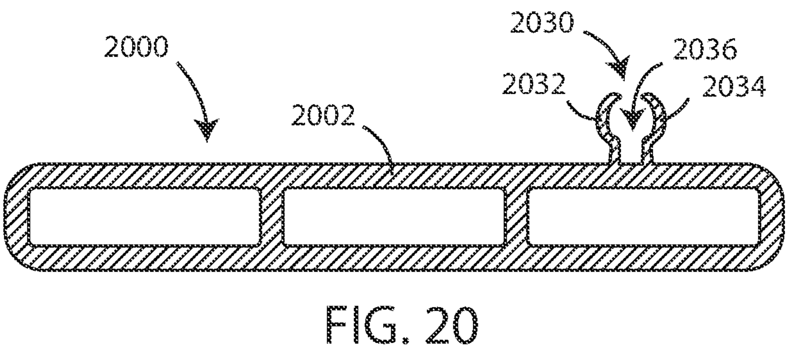
FIG. 20 is a cross-sectional view of an extruded article in accordance with various embodiments herein.

The unique properties of the advanced composites herein can be advantageously used on various structures or components that require a degree of flexing without breaking or cracking. By way of example, advanced composites herein can be used to form snap-fit type mechanisms or portions thereof. Referring now to FIG. 20, a cross-sectional view of an extruded article 2000 is shown in accordance with various embodiments herein. The extruded article 2000 can include a body member 2002 and a snap-fit mechanism 2030. Many different specific configurations for a snap-fit mechanism can be used. However, in this particular example, the snap-fit mechanism 2030 includes a first arm 2032, a second arm 2034, and a receiving area 2036 between the first arm 2032 and the second arm 2034. The ball, bulbous portion, cylinder or similar mating structure of a separate piece or article (not shown) can be snapped into place within the receiving area 2036 and, by that mechanism, the extruded article 2000 can be held in place with respect that that separate piece. In various embodiments, the snap-fit mechanism 2030 or portions thereof can be formed of an advanced composite such as those described herein.

Advanced Composite Materials

As referenced above as "second compositions", advanced composite materials herein can include a polymeric resin, fibers, and at least one of particles and an impact modifier. Many different specific formulations are contemplated and details of exemplary compositions are described in U.S. patent appliation Ser. Nos. 15/439,586 and 15/439,603, the content of which is herein incorporated by reference. However, in some embodiments, the advanced composite material can include a polymer resin, fibers, and at least one component selected from the group consisting of at least 1% by weight particles and at least 5 phr impact modifier. Details of these components are described in more detail below.

Some embodiments of advanced composite materials herein have a remarkably high modulus of elasticity. For example, in various embodiments such materials can have a modulus of elasticity of 800,000, 900,000, 1,000,000, 1,100, 000, 1,200,000, 1,300,000, 1,400,000, 1,500,000, 1,600,000, 1,700,000, 1,800,000, 1,900,000, 2,000,000, 2,200,000, 2,400,000, 2,600,000, 2,800,000, 3,000,000, 3,500,000 or 4,000,000 psi, or within a range between any of the foregoing. By comparison, some embodiments of composites with the same or similar polymeric resins, but lacking fibers and impact modifier have a modulus of elasticity of about 850,000. By way further comparison, non-composite vinyl (PVC) compositions can have a modulus of elasticity of 300,000 to 500,000 psi. In various embodiments, an extruded article can include a second composition, which can be an advanced composite herein, having a modulus of elasticity at least 50,000 psi higher than a first composition, wherein the second composition is different than the first composition. In some embodiments, the second composition can have a modulus of elasticity at least 100,000, 250,000, 500,000, 750,000, 1,000,000, 1,250,000, 1,500,000, 1,750, 000, 2,000,000, or 2,500,000 psi higher than the first composition. In some embodiments, the second composition can have a modulus of elasticity at least 10, 20, 30, 40, 50, 60, 70, 80, 100, 200, 300, 400, 500, 600, 700, or 800 percent higher than the first composition.

Particles

Descriptions herein of exemplary particles are only applicable for the description of embodiments herein and not for other patents or patent applications of the applicant and/or inventors unless explicitly stated to the contrary.

As described above, some compositions herein have a portion of particles resulting in non-aligned fiber orientation. Particles can include both organic and inorganic particles. Such particles can be roughly spherical, semi-spherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. In some embodiments, particles herein can have an aspect ratio of between about 10:1 and about 1:1. In some embodiments, particles herein can have an aspect ratio of between about 8:1 and about 1:1. In some embodiments, particles herein can have an aspect ratio of between about 7:1 and about 1:1. In some embodiments, particles herein can have an aspect ratio of between about 6:1 and about 1:1. In some embodiments, particles herein can have an aspect ratio of between about 5:1 and about 1:1. In some embodiments, particles herein can have an aspect ratio of between about 4:1 and about 1:1. In some embodiments, particles herein can have an aspect ratio of between about 3:1 and about 1:1. In some embodiments, particles herein can have an aspect ratio of between about 2:1 and about 1:1. Such aspect ratios can be assessed by first taking the largest dimension of the particle (major axis) and then comparing it with the next largest dimension of the particle that is perpendicular to the major axis.

In various embodiments, the particles can be, on average, from about 0.01 mm to about 8 mm in their largest dimension (or major axis or characteristic dimension). In various embodiments, the particles can be from about 0.25 mm to about 5 mm in their largest dimension. In various embodiments, the particles can have an average size of about 0.1 mm to about 2.5 mm in their largest dimension. In various embodiments, the particles can have an average size of about 0.18 mm to about 0.6 mm in their largest dimension. In various embodiments, the particles can have an average size of greater than about 0.6 mm in their largest dimension. For example, in various embodiments, the particles can have an average size of about 0.6 mm to about 3.0 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

In some embodiments, the particles can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, 3.0 mm, 3.5 mm, 4.0 mm, 4.5 mm, 5.0 mm, 5.5 mm, 6.0 mm, 6.5 mm, 7.0 mm, and 8.0 mm.

In some embodiments, the particles are organic particles and can have an average size of their largest dimension falling within a range wherein the lower bound and the upper bound can be any of the following sizes (provided that the upper bound is greater than the lower bound): 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

In some embodiments, the particles are inorganic particles and can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

As referenced above, aspect ratios can be assessed by first taking the largest dimension of the particle (major axis) and then comparing it with the next largest dimension of the particle along an axis (Y axis) that is perpendicular to the major axis (X axis). The depth or Z axis measure (Z axis) can be measured along an axis that is perpendicular to both the X and Y axes used to specify the aspect ratio. In some embodiments, particles herein can have an average or maximum depth or Z axis measure in the context of the aspect ratios described above that is equal to at least about 0.1, 0.2, 0.4, 0.5, 0.6, 0.7, 0.8, 0.9, or 0.95 of the smaller of the two dimensions used to assess aspect ratio.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica and talc, and the like.

Particles herein can specifically include organic particles. Particles herein can specifically include particles comprising substantial portions of lignin, hemicellulose and cellulose (lignocellulosic materials), such as wood particles or wood flour. Wood particles can be derived from hardwoods or softwoods. In various embodiments, the wood particles can have a moisture content of less than about 8, 6, 4, or 2 percent.

Particle sizes and distributions thereof can be described using sieve sizes. Standard U.S. sieve sizes and Tyler mesh sizes are shown in Table 3 below with the corresponding opening size.

TABLE 3

| U.S. Sieve Size | Tyler Mesh Size | Opening (mm) |
|---|---|---|
| 10 | 9 | 2.00 |
| 12 | 10 | 1.68 |
| 14 | 12 | 1.41 |
| 16 | 14 | 1.19 |
| 18 | 16 | 1.00 |
| 20 | 20 | 0.841 |
| 25 | 24 | 0.707 |
| 30 | 28 | 0.595 |
| 35 | 32 | 0.500 |
| 40 | 35 | 0.420 |
| 45 | 42 | 0.354 |
| 50 | 48 | 0.297 |
| 60 | 60 | 0.250 |
| 70 | 65 | 0.210 |
| 80 | 80 | 0.177 |
| 100 | 100 | 0.149 |
| 120 | 115 | 0.125 |

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm).

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm) and less than 9 Mesh (or 10 sieve size—corresponding to a pore size of 2.00 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm) and less than 9 Mesh (or 10 sieve size—corresponding to a pore size of 2.00 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions, and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition with non-aligned fibers can be greater than or equal to about 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition with non-aligned fibers can be less than or equal to about 80, 75, 70, 65, 60, 55, 50, 45, 40, 35, 30, 25, 20, 10, or 5 weight percent. In some embodiments, the amount of particles can be in a range wherein each of the foregoing numbers and serve as the upper or lower bound of the range provided that the upper bound is larger than the lower bound.

The amount of particles in the extruded composition, as measured based on volume, can be greater than or equal to about 1, 2, 3, 4, 5, 6, 7, 8, 9, 10, 12, 14, 16, 18, 22, 24, 26, 28, 30, 32, 34, or 36 percent of the total composition. In some embodiments, the amount of particles as measured based on volume can be in a range wherein any of the foregoing amounts can serve as the upper or lower bound of the range.

It will be appreciated that in some embodiments, some amount of out of specification particles can also be included. As such, in some embodiments, at least 50, 70, 80, 90, 95, or 98 wt. % of the total particle content of the composition are those such the particles described above. For example, in some embodiments at least 50 wt. % of the particles are selected from the group consisting of organic particles having an average largest dimension of greater than 100 microns and an aspect ratio of 4:1 or less and inorganic particles having an average largest dimension of greater than 10 microns and an aspect ratio of 4:1 or less.

Fibers

As used herein, the term “non-aligned” with regard to fiber orientation shall refer to the state of fibers in an extrusion with their lengthwise axis not exhibiting the same degree of alignment (e.g., parallel to) to the direction of extrusion that an otherwise similar composition lacking particles as described herein would assume after going through an extrusion process. Non-aligned fibers can exhibit an average offset angle relative to the extrusion direction of greater than 20 degrees.

As used herein, the term “substantially random” with regard to fiber orientation shall refer to the state of the fibers in an extrusion with their lengthwise axis not being substantially aligned in parallel with the direction of extrusion of the article. The phrase “substantially random” does not require the orientation of the fibers to be completely mathematically random.

Descriptions herein of exemplary fibers are only applicable for the description of embodiments herein and not for other patents or patent applications of the applicant and/or inventors unless explicitly stated to the contrary. Various embodiments of compositions and extrudates herein include a fiber component. Advanced composite compositions herein (including but not limited to compositions referred to as “second compositions herein”) can include a fiber component.

The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning.

Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites herein include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to millimeters. In some embodiments, the average lengths of the fibers used herein can be from 2 millimeters to 8 millimeters. It will be appreciated that fiber breakage typically occurs as a result of shear forces within the extruder. Therefore the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

In various embodiments, the particles can be substantially uniformly dispersed within a given extruded composition.

Polymer Resin

As used herein, the term "resin" shall refer to the thermoplastic polymer content of the extruded or pultruded composition. The resin portion of the composition excludes any polymer content provided by processing aids.

Polymer resins used with embodiments herein (including "first compositions" and/or "second compositions" herein) can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone, and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV-ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (DI/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). An immiscible or non-alloyed blend of polymers typically displays two or more glass transition temperatures associated with immiscible polymer phases.

Polymeric resin materials herein can retain sufficient thermoplastic properties to permit melt blending with fiber, to permit formation of extruded articles or other extrudates such as pellets, and to permit the composition material or pellet to be extruded in a thermoplastic process or in conjunction with a pultrusion process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated at least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide), and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book *Poly(Lactic Acid) Synthesis, Structures, Properties, Processing, and Applications*, Wiley Series on Polymer Engineering and Technology (Rafael Auras et al. eds., 2010).

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F. can be used.

The polymer resin can make up the largest share of the extruded composition. In some embodiments, the polymer resin is at least about 20, 25, 30, 35, 40, 45, 50, 55, 60, 70, 75, 80, 85, 90, 95, 98, or 99 wt. % of the extruded composition. In some embodiments, the amount of the polymer resin in the composition can be in a range wherein any of the foregoing numbers can serve as the upper or lower bound of the range, provided that the upper bound is larger than the lower bound.

Impact Modifiers

Advanced composite compositions herein (including but not limited to compositions referred to as "second compositions herein") can also include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, or ethylene-n-butyl acrylate-carbon monoxide. Exemplary impact modifier copolymers can include those sold under the tradename ELVALOY, commercially available from DuPont.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to phr. In some embodiments, the composition can include an amount of impact modifier of greater than or equal to 5 phr and less than or equal to 20 phr. In some embodiments, the composition can include an amount of impact modifier of greater than or equal to 10 phr and less than or equal to 20 phr.

Other Components

It will be appreciated that various other components can be extruded with compositions herein (first or second compositions) and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. % based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

Methods

Methods herein can include various procedures. By way of example, methods can include one or more of mixing, compounding, gas removal, moisture removal, and final extrusion. Materials can be mixed using a variety of mixing means, including extruder mechanisms wherein the materials are mixed under conditions of high shear until the appropriate degree of wetting and intimate contact is achieved. In some embodiments, the moisture content can be controlled at a moisture removal station. By way of example, the heated composite is exposed to atmospheric pressure or reduced pressure at elevated temperature for a sufficient period of time to remove moisture, resulting in a final desired moisture content. In some embodiments, the final moisture content is about 8 wt. % or less.

As used herein, the term "compounding" refers to the process of combining a polymeric material with at least one other ingredient, either polymeric or non-polymeric, at a temperature sufficiently elevated to allow the ingredients to be mixed into a molten mass.

In some cases, inputs are fed directly, without a compounding step, into an extruder (including but not limited to single screw, double screw, co-rotating, counter-rotating, conical, parallel or the like) that produces the final product, such as an extruded article. In other cases, the inputs can first be processed with a compounding extrusion step, wherein the inputs are mixed together and run through a compounding extruder which provides for high levels of mixing and interaction of components. While various extruders can be used for compounding, typically twin-screw extruders are used in either co-rotating or counter-rotating configurations. In some embodiments, a compounding operation can be referred to as a pelletizing operation, because the output from the compounding operation is typically pellets.

The articles herein can be formed by known extrusion (including co-extrusion) techniques, pultrusion techniques, and the like. At its most basic level, extrusion is the process of producing continuous articles by forcing a material through a die. The extruded article can be of various shapes depending on the extrusion die geometry. In polymer extrusion, the material being forced through a die is a molten polymer.

Profile extrusion refers to the process of making continuous shapes by extrusion. The term "profile extrusion" also refers to the resultant extruded article formed during the profile extrusion process. In certain embodiments, the article, which is particularly in the form of a building component, is in the form of a profile extrusion or extruded article. In some embodiments, profile extrusion can exclude the formation of sheets.

In addition, a process called co-extrusion can be used herein. Co-extrusion refers to a process whereby two or more polymeric materials, each extruded separately, are joined in a molten state in the die. In some applications, the co-extruded surface layer can be referred to as a capping layer or capstock. In some embodiments, compositions herein can be extruded in the form of a capping layer over non-thermoplastic materials such as wood, thermosets, or metal.

In some embodiments, compositions herein can be extruded in particular wall segments (internal or external) such that the placement provides reinforced strength or other benefits identified through Finite Element Analysis (FEA). By way of example, the composite material herein can be used in applications wherein the desirable strength is known through FEA modeling and applied only in those specific areas to enhance lineal performance or extruded specifically in a particular lineal within a unit assembly to enhance unit performance.

The articles herein can be in the form of a profile that has been formed by an extrusion process (referred to herein as a "profile extrusion"), including, in some embodiments, a co-extruded layer or capping material (e.g., over another material such as a wood window or door component). The articles herein can be in the form of an extruded article, a pultruded article, or a combination thereof.

One exemplary piece of equipment for mixing and extruding the compositions herein is an industrial extruder device. Such extruders can be obtained from a variety of manufacturers.

Functional Properties

Extrudates in accordance with embodiments herein (including extruded articles and specifically profile extrusions) can exhibit desirable properties in terms of impact resistance, strength, and the like.

In various embodiments, extrudates herein can exhibit a Gardner impact resistance of greater than 0.2 in*lb/mil. In some embodiments, extrudates herein can exhibit a Gardner impact resistance of greater than 0.4 in*lb/mil. Gardner impact can be assessed in accordance with ASTM D4226-09.

In various embodiments, extrudates herein can exhibit a Regular Izod Impact value of greater than 100, 150, 200, 250, 300, 350, 400, 450, 500, 550, 600, 650, 700, 750, 800, 850, 900, 950, or 1000 J/m. In some embodiments, the Regular Izod Impact value can be less than 3000 J/m. Regular Izod Impact value can be measured in accordance with ASTM D256.

In various embodiments, extrudates herein can exhibit a flexural modulus of greater than 500,000, 550,000, 600,000, 650,000, 700,000, 750,000, 800,000, 850,000, 900,000, 950,000, 1,000,000, 1,100,000, 1,200,000, 1,300,000, 1,400,000, or 1,500,000 PSI. In some embodiments, the flexural modulus can be less than 4,000,000 PSI. Flexural modulus can be measured in accordance with ASTM D790 (D790-15e2).

In various embodiments, extrudates herein can exhibit a flexural strain of greater than 0.001, 0.005, 0.01, 0.015, 0.02, 0.025, 0.03, 0.04, 0.06, 0.08, or 0.1 in/in. In some embodiments, the flexural strain can be less than or equal to 1 in/in. Flexural strain can be measured in accordance with ASTM D790 (D790-15e2).

In various embodiments, extrudates herein can exhibit a flexural yield strength of greater than 3,000, 5,000, 7,000, 9,000, 11,000 13,000, 15,000, 17,000, or 19,000 PSI. In some embodiments, the yield strength can be less than 40,000 PSI. Flexural yield strength can be measured in accordance with ASTM D790 (D790-15e2).

In various embodiments, extrudates herein can exhibit a tensile modulus (or modulus of elasticity) of greater than 500,000, 550,000, 600,000, 650,000, 700,000, 750,000, 800,000, 900,000, 1,000,000, 1,100,000, 1,200,000, 1,300,000, 1,400,000, 1,500,000, 1,600,000, 1,700,000, 1,800,000, 1,900,000, 2,000,000, 2,200,000, 2,400,000, 2,600,000, 2,800,000, 3,000,000, 3,500,000 or 4,000,000 psi, or within a range between any of the foregoing. In some embodiments, the tensile modulus can be less than 4,000,000 PSI. Tensile modulus can be measured in accordance with ASTM D638 (D638-14).

In various embodiments, extrudates herein can exhibit a max tensile strain of greater than 0.1, 0.5, 1.0, 1.5, 2.0, 2.5, 3.5, 4.0, 5.0, 7.0, or 10.0%. Max tensile strain can be measured in accordance with ASTM D638 (D638-14).

Aspects may be better understood with reference to the following examples. These examples are intended to be representative of specific embodiments, but are not intended as limiting the overall scope of embodiments herein.

EXAMPLES

Formation of Composites:

The materials used to form the test compositions were first compounded using a compounding apparatus. In specific, particles (if used), fibers, pigment and polymer resin were fed into a compounding extruder using gravimetric metering feeders. The compounding extruder was run at 300 RPM and be heated to approximately 140-190 degrees Celsius. The particles (if used), fibers, pigment and polymer resin were heated to approximately 140-180 degrees Celsius as they passed through the melting section, mixed as they passed through the mixing section, and then water vapor and other off gases were allowed to escape through a venting section at approximately 160-180 degrees Celsius. The composite was further compounded at a pumping section at approximately 170-190 degrees Celsius. The composite was fed into a pelletizing die producing small pellets of composite. The test substrates were then extruded using a rectangular die profile (1" by 0.90") at a line speed of approximately 1-3 feet per minute using a ¾ inch single screw extrusion apparatus. Zones of the extruder were heated to approximately 170-210 Celsius with material being fed with a gravimetric feeder into the first zone. The formed strips were then passed onto a conveyer belt to match the extruder output.

Figure 21:
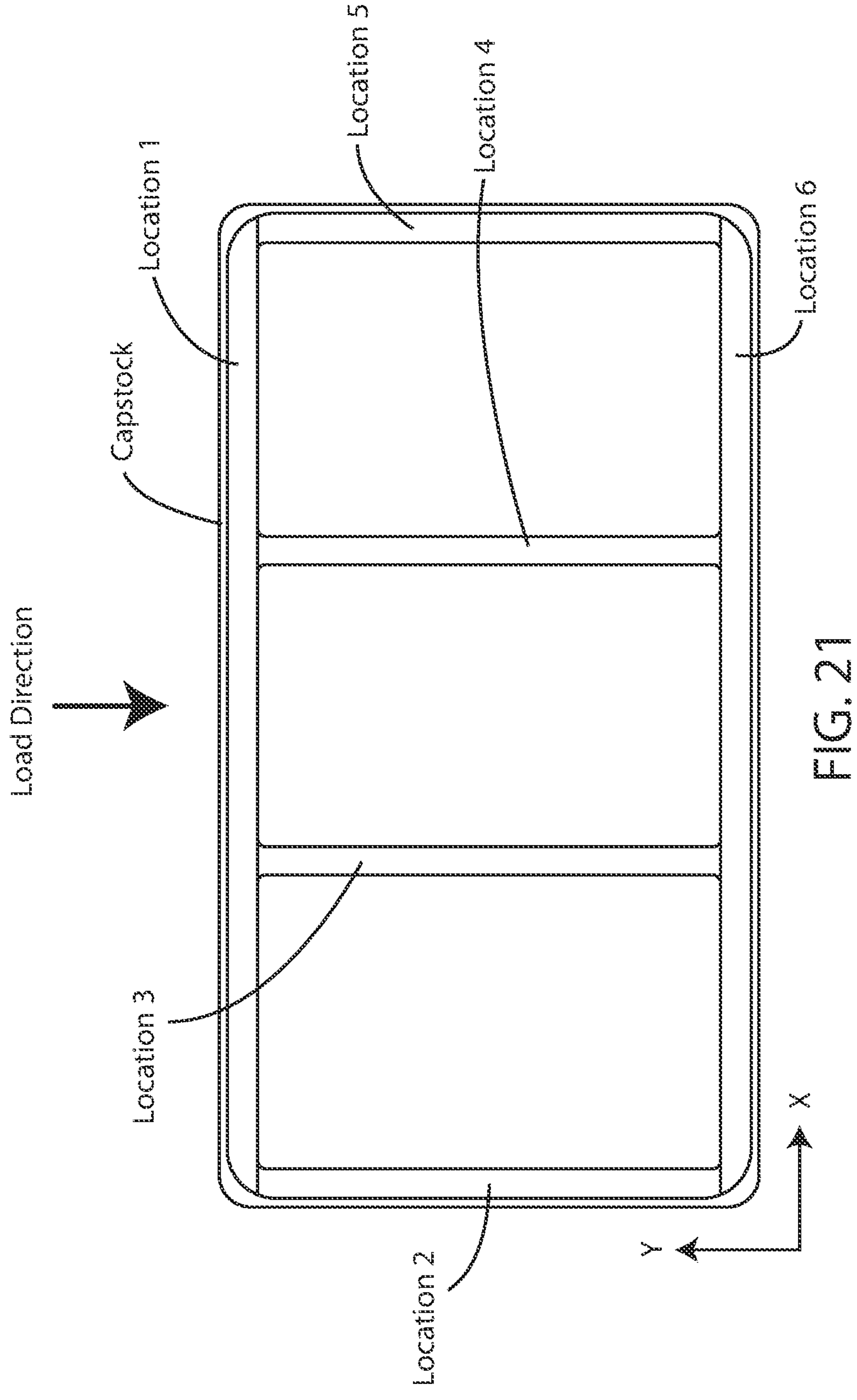
FIG. 21 is a cross-sectional view of an extruded article used in conjunction with the examples herein.
Figure 22:
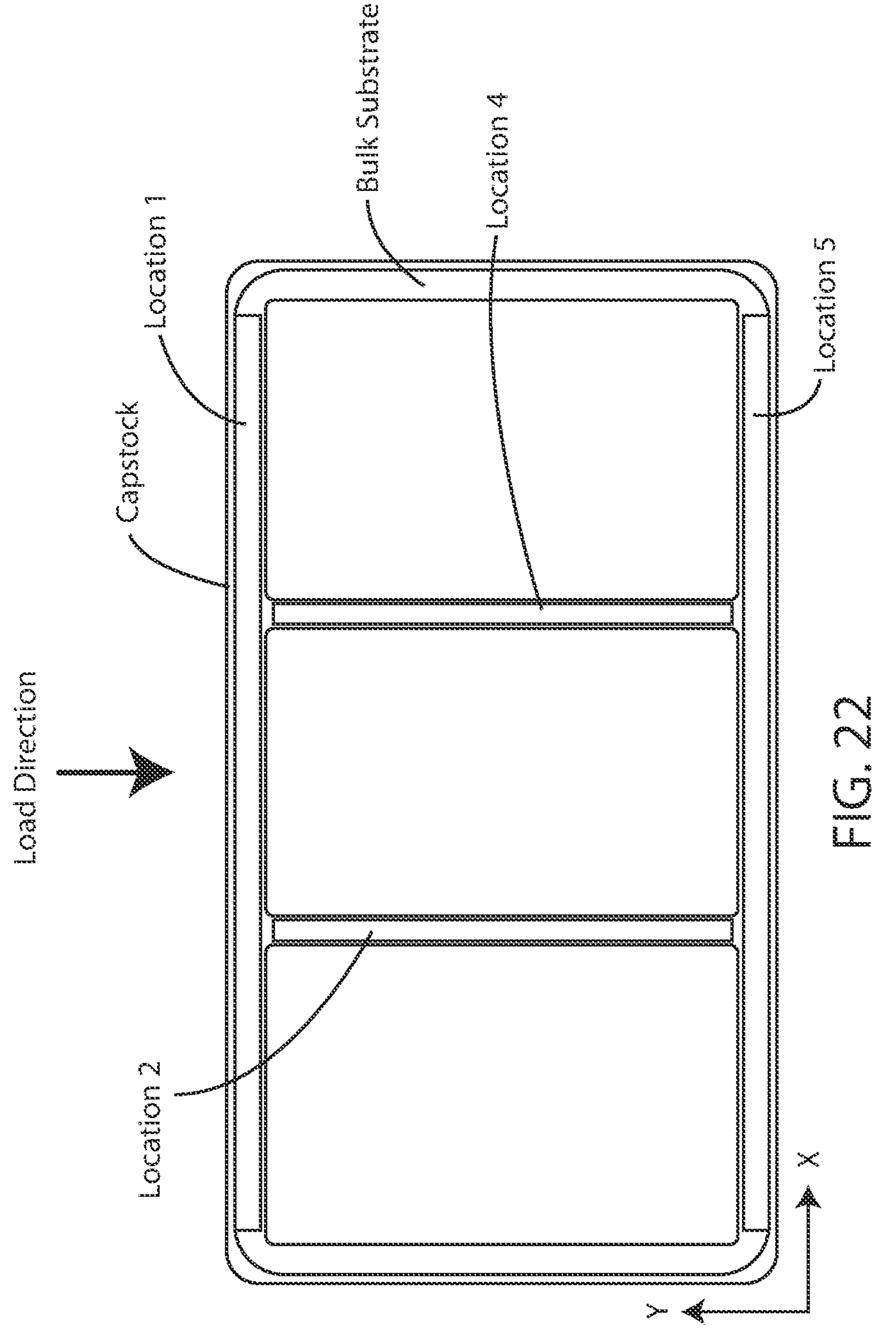
FIG. 22 is a cross-sectional view of an extruded article used in conjunction with the examples herein.

Example 1: FEA Analysis of Extruded Articles with Selective Placement of Advanced Composite Materials Utilizing ABAQUS FEA software, selective stiffening and selective toughening was examined. In specific, the effects of substituting different portions with advanced composite materials herein or other materials was evaluated. The first profile geometry (1.7" by 3.2") was as shown in FIG. 21 for a first set of variations and the second profile geometry (1.7" by 3.2") was as shown in FIG. 22 for a second set of variations.

The materials tested are summarized below in Table 4:

TABLE 4

| Material | Resin | Impact Modifier | Fibers | Particles |
|---|---|---|---|---|
| "PVC"-Extruded Non-Composite PVC | PVC | — | — | — |
| "EXP1"-Exemplary Advanced Composite 1 | PVC | 10 phr | 30 wt. % glass | — |
| "EXP2"-Exemplary Advanced Composite 2 | PVC | 10 phr | 15 wt. % glass | 5 wt. % wood particles |
| "COMP1"-Extruded Polymeric Composite | PVC | — | — | 40 wt. % wood particles |
| "RPLA"-Extruded Glass Reinforced Composite | PLA | 10 phr | 40 wt. % glass | 1 wt. % talc |

The variations tested for the first profile geometry seen in FIG. 21 are summarized below in Table 5 (capstock wall thicknesses were 0.010 in locations 1-6 were 0.090 in):

TABLE 5

| (Corresponds to FIG. 21) | | | | | | | | |
|---|---|---|---|---|---|---|---|---|
| ID | Reference FIG. | Capstock | Location 1 | Location 2 | Location 3 | Location 4 | Location 5 | Location 6 |
| Profile 1-1 | 21 | PVC | COMP1 | COMP1 | COMP1 | COMP1 | COMP1 | COMP1 |
| Profile 1-2 | 21 | PVC | EXP2 | COMP1 | COMP1 | COMP1 | COMP1 | COMP1 |
| Profile 1-3 | 21 | PVC | EXP1 | COMP1 | COMP1 | COMP1 | COMP1 | EXP1 |
| Profile 1-4 | 21 | PVC | RPLA | COMP1 | COMP1 | COMP1 | COMP1 | RPLA |
| Profile 1-5 | 21 | PVC | COMP1 | COMP1 | EXP2 | EXP2 | COMP1 | COMP1 |
| Profile 1-6 | 21 | PVC | COMP1 | RPLA | RPLA | RPLA | RPLA | COMP1 |
| Profile 1-7 | 21 | PVC | EXP1 | COMP1 | EXP1 | EXP1 | COMP1 | EXP1 |
| Profile 1-10 | 21 | PVC | EXP2 | COMP1 | RPLA | RPLA | COMP1 | EXP1 |

The variations tested for the second profile geometry seen in FIG. 22 are summarized below in Table 6:

TABLE 6

| (Corresponds to FIG. 22) | | | | | | | | |
|---|---|---|---|---|---|---|---|---|
| ID | Reference FIG. | Capstock | Location 1 | Location 2 | Location 3 | Location 4 | Location 5 | Bulk Substrate |
| Profile 1-8 | 22 | PVC | EXP1 | EXP1 | EXP1 | EXP1 | EXP1 | COMP1 |
| Profile 1-9 | 22 | PVC | RPLA | RPLA | RPLA | RPLA | RPLA | COMP1 |

Stiffness was tested as a 3 point bend test on 4 foot lineal. Lineal fixed on ends, 200 lb point load applied in center. Max deflection measured at center of lineal for both selective and embedded reinforcement examples. A decrease in deflection illustrates an improvement in lineal stiffness. The results are shown in Tables 7-8 below:

TABLE 7

| ID | Deflection (in) |
|---|---|
| Profile 1-1 | 1.16 |
| Profile 1-2 | 1.13 |
| Profile 1-3 | 0.86 |
| Profile 1-4 | 0.67 |
| Profile 1-5 | 1.16 |
| Profile 1-6 | 0.98 |
| Profile 1-7 | 0.83 |
| Profile 1-10 | 0.90 |

TABLE 8

| ID | Deflection (in) |
|---|---|
| Profile 1-8 | 0.9318 |
| Profile 1-9 | 0.7643 |

In addition to stiffness, toughness was also measured. In specific, toughness was tested 3 point bend test on 4 foot lineal. Lineal fixed on ends, load ramped until rupture reached. Max load and max deflection measured at center of lineal directly before failure. An improvement in max load and deflection indicates and improvement in overall profile toughness which is desirable in many applications. The results are shown in Table 9 below:

TABLE 9

| ID | Max Load (Ibf) | Deflection (in) |
|---|---|---|
| Profile 1-1 | 303 | 2.20 |
| Profile 1-2 | 300 | 2.75 |
| Profile 1-3 | 365 | 4.06 |
| Profile 1-5 | 300 | 2.29 |
| Profile 1-7 | 370 | 4.18 |
| Profile 1-8 | 356 | 3.97 |

Example 2: Advanced Composite Material with Pigment Inclusion

Figure 23:
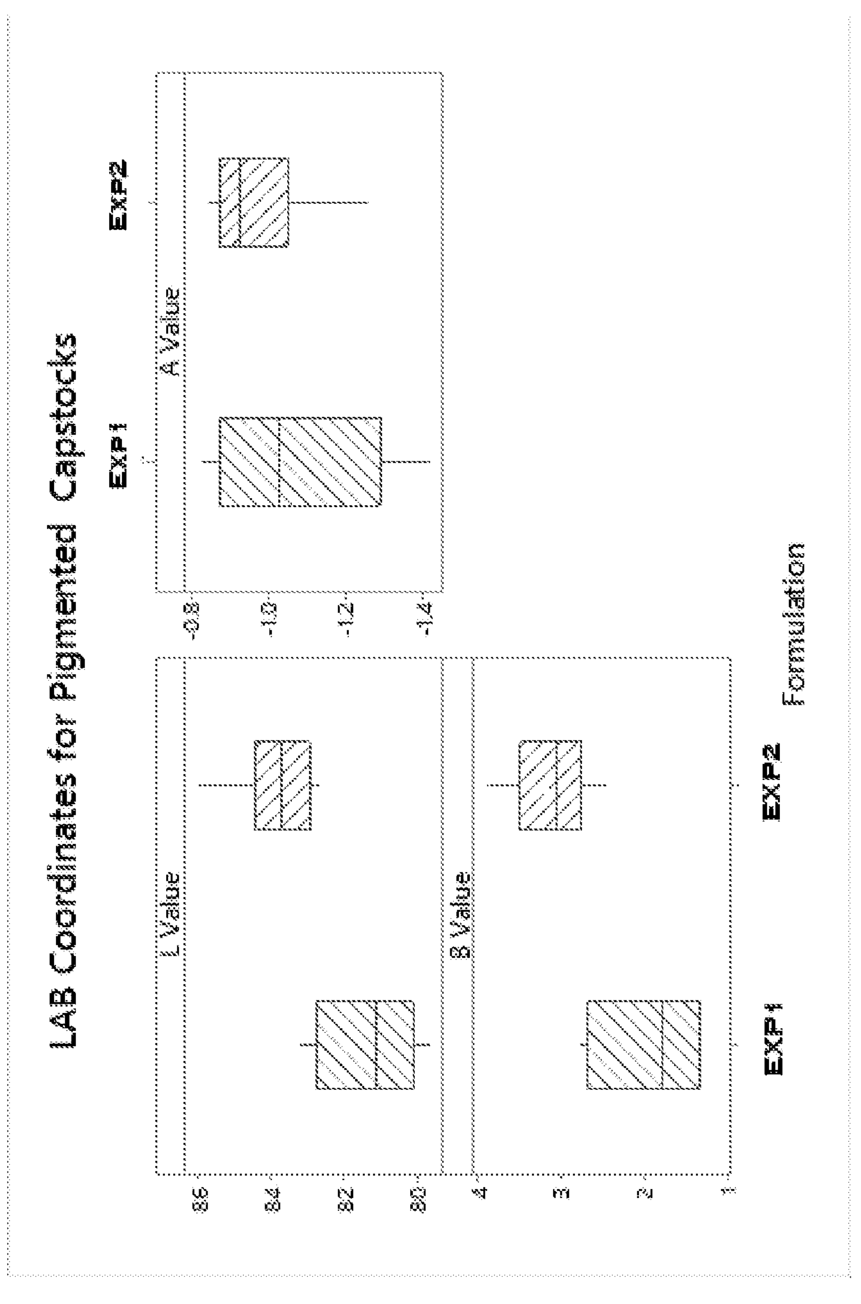
FIG. 23 is a graph showing aspects of pigmented capstocks in accordance with various embodiments herein.

Formulas for EXP1 and EXP2 above were altered by the inclusion of 10% by weight pigment. Color was then measured according to ASTM E1331-15 in LAB coordinates with a BYK colorimeter spectrophotometer. The results are shown in FIG. 23.

Example 3: FEA Analysis of Extruded Articles with Advanced Composite Materials as Capstock Utilizing ABAQUS FEA software, the long term dimensional stability of certain profile and material configurations under differential temperature uptake and heat-cool cycling was explored. This was done through the use and understanding of the viscoelastic properties of our materials such as modulus as function of temperature, stress relaxation characteristics, and creep characteristics.

Various portions of the capstock layer were substituted with advanced composite materials herein or other materials. In particular, the first profile geometry (1.7" by 3.2") was as shown in FIG. 24 for a first set of variations and the second profile geometry (1.7" by 3.2") was as shown in FIG. 25 for a second set of variations.

The first set of variations tested is summarized below in Table 10 (capstock wall thicknesses were 0.010 in substrate wall thicknesses were 0.090 in):

TABLE 10

Figure 24:
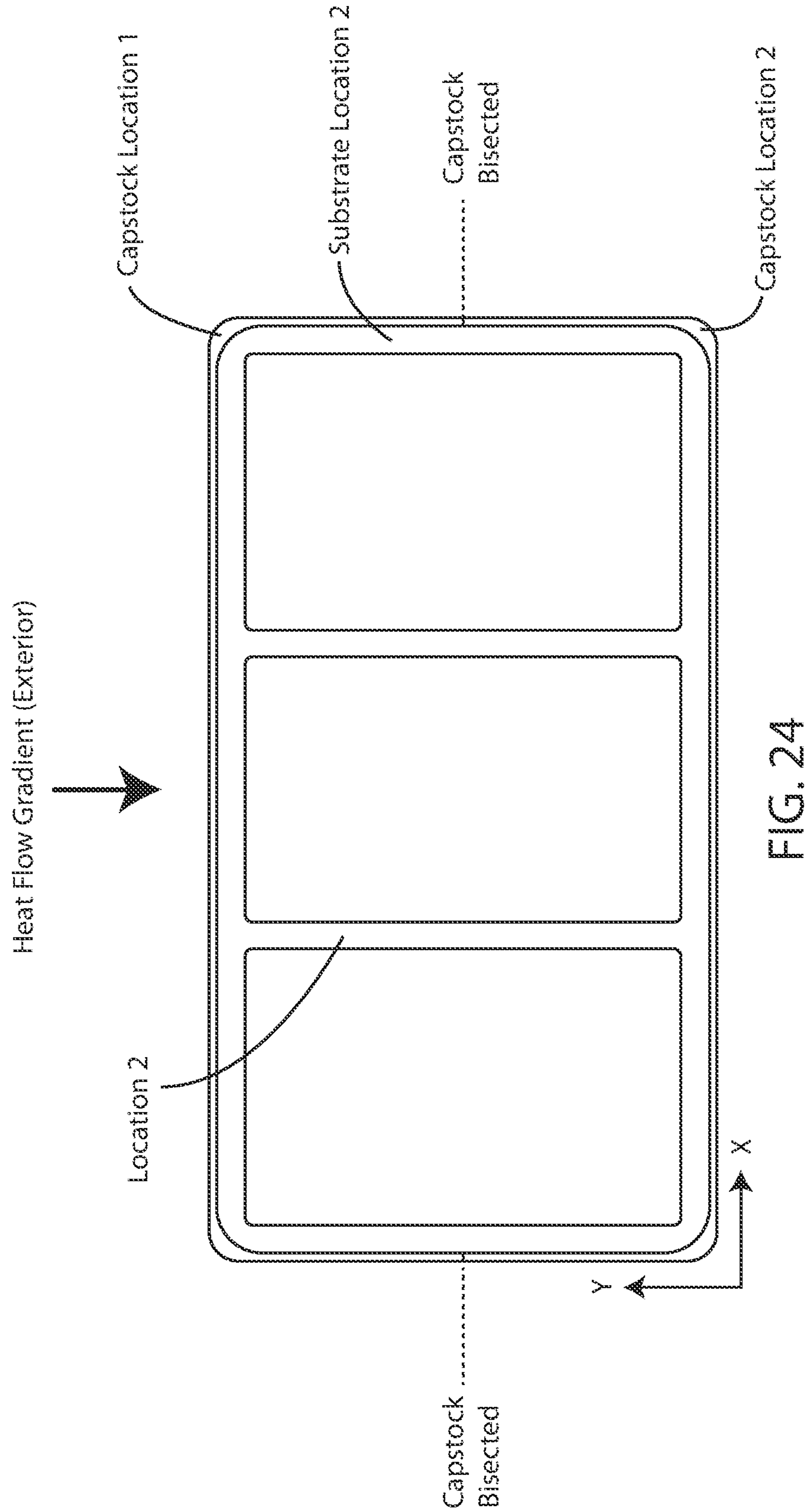
FIG. 24 is a cross-sectional view of an extruded article used in conjunction with the examples herein.
Figure 25:
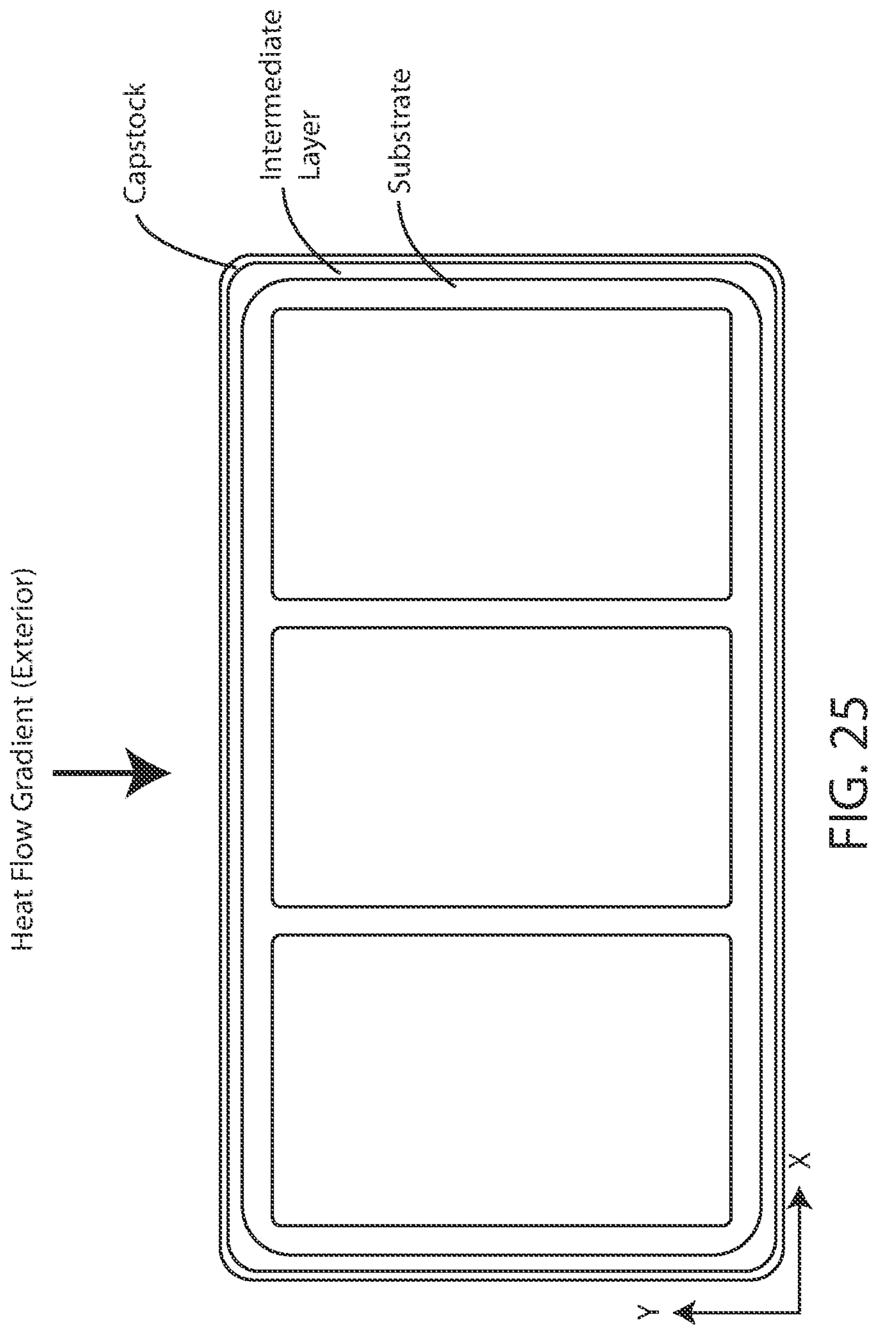
FIG. 25 is a cross-sectional view of an extruded article used in conjunction with the examples herein.

(Corresponds to FIG. 24)

| ID | Reference FIG. | Capstock Location 1 | Capstock Location 2 | Substrate |
|---|---|---|---|---|
| Profile 2-0 | 24 | PVC | PVC | COMP1 |
| Profile 2-1 | 24 | EXP2 | EXP2 | COMP1 |
| Profile 2-2 | 24 | EXP1 | EXP1 | COMP1 |
| Profile 2-3 | 24 | EXP2 | PVC | COMP1 |
| Profile 2-4 | 24 | EXP1 | PVC | COMP1 |
| Profile 2-5 | 24 | EXP1 | EXP2 | COMP1 |
| Profile 2-6 | 24 | EXP2 | EXP1 | COMP1 |

The first set of variations tested is summarized below in Table 11 (intermediate layer wall thicknesses were 0.010 in, substrate wall thicknesses were 0.090 in, capstock thicknesses were 0.005 in).

TABLE 11

(Corresponds to FIG. 25)

| ID | Reference FIG. | Intermediate Layer | Capstock | Substrate |
|---|---|---|---|---|
| Profile 2-8 | 25 | EXP1 | PVC | COMP1 |

Figure 26:
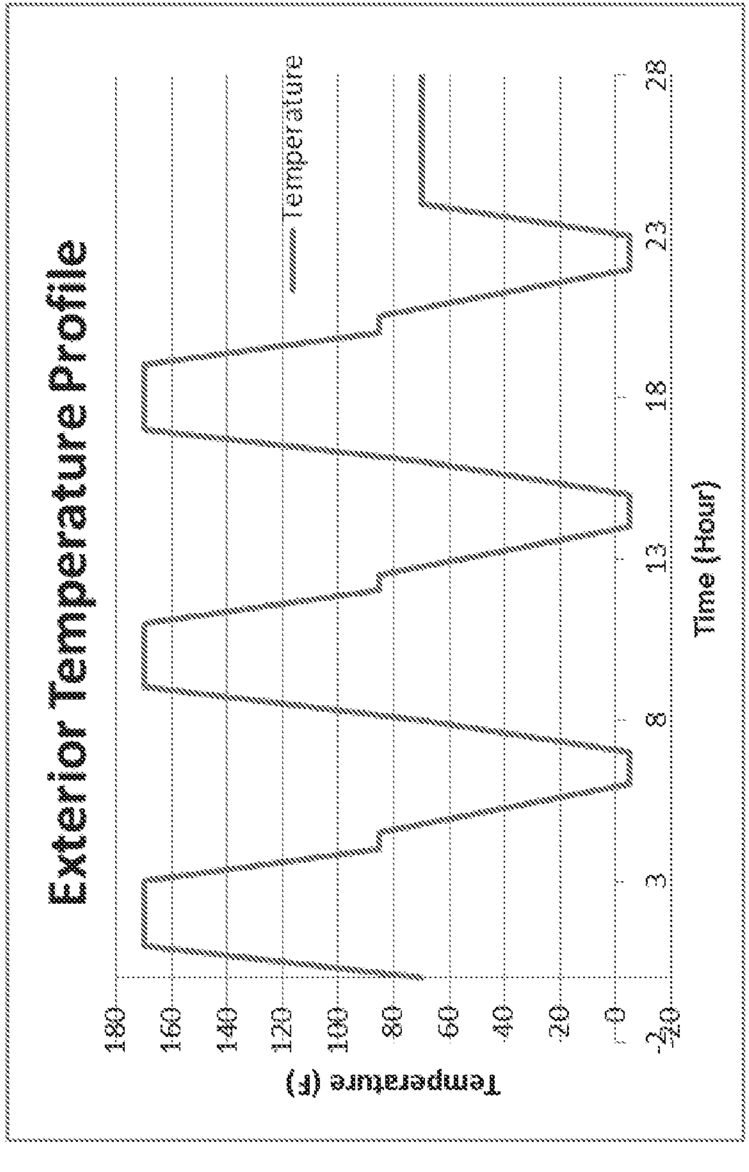
FIG. 26 is a graph showing a temperature profile over time.
Figure 27:
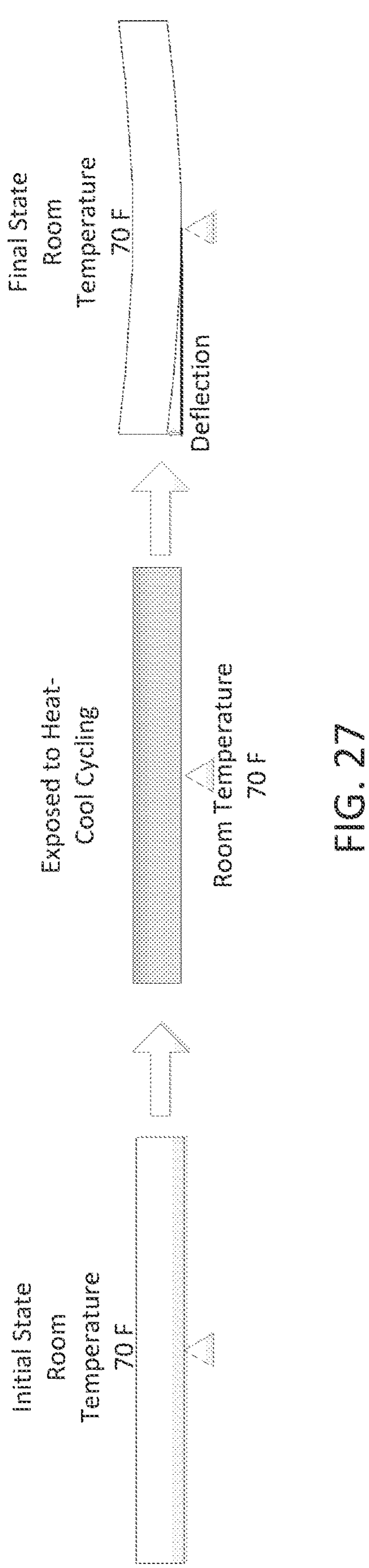
FIG. 27 is a diagram illustrating deflection in response to thermal cycling.

Utilizing the ABAQUS FEA software, a sample profile is exposed to three heat-cool cycles as outlined in the temperature cycling graph and illustration in FIG. 26. The profile is exposed to three heat-cool cycles with the bottom side (see FIG. 27) being fixed at room temperature. This introduces a differential temperature gradient throughout the lineal which in turn causes permanent deformation at room temperature following the completion of said cycling. This permanent deformation is represented by "Deflection" in FIG. 27, and is the measurement method utilized to illustrate changes in dimensional stability for the different profile and material configurations. A reduction in "Deflection" illustrates an improvement in dimensional stability.

The results are shown in Tables 12 and 13 below:

TABLE 12

| ID | Deflection (in) for 2 Foot Lineal | Deflection (in) for 4 Foot Lineal | Deflection (in) for 6 Foot Lineal |
|---|---|---|---|
| Profile 2-0 | 1.27E−02 | 5.08E−02 | 1.14E−01 |
| Profile 2-1 | 9.28E−03 | 3.71E−02 | 8.35E−02 |
| Profile 2-2 | 6.05E−03 | 2.42E−02 | 5.45E−02 |
| Profile 2-3 | 8.96E−03 | 3.58E−02 | 8.06E−02 |
| Profile 2-4 | 5.15E−03 | 2.06E−02 | 4.64E−02 |
| Profile 2-5 | 7.03E−03 | 2.81E−02 | 6.33E−02 |
| Profile 2-6 | 9.66E−03 | 3.86E−02 | 8.69E−02 |

TABLE 13

| ID | Deflection (in) for 2 Foot Lineal | Deflection (in) for 4 Foot Lineal | Deflection (in) for 6 Foot Lineal |
|---|---|---|---|
| Profile 2-8 | 6.91E−03 | 2.76E−02 | 6.22E−02 |

Example 4: Improved Fastener Retention

Fastener ports, such as screw chases, can be present on extruded articles to enable frame assembly in the factory as well as in the field (accessories, hardware, etc). The ability to control the geometry precisely can help create features which direct the screws (and the angle through the substrate) and guide them to the appropriate locations. Better alignment provides a better seated screw and gives the maximum efficacy of the screw with the best possible aesthetics.

An evaluation of fastener holding strength for fiber reinforced materials was conducted using Universal Testing Machine (UTM) with a 10001b load cell at a crosshead speed of 0.2 inches per minute in the tensile mode.

The sample preparation for this test was a single wall specimen cut from an extruded hollow profile, with a fastener (#6 10×1" screw) driven into the single wall (thickness of 0.090") sample in order to represent orientation in a normal production application.

Figure 28:
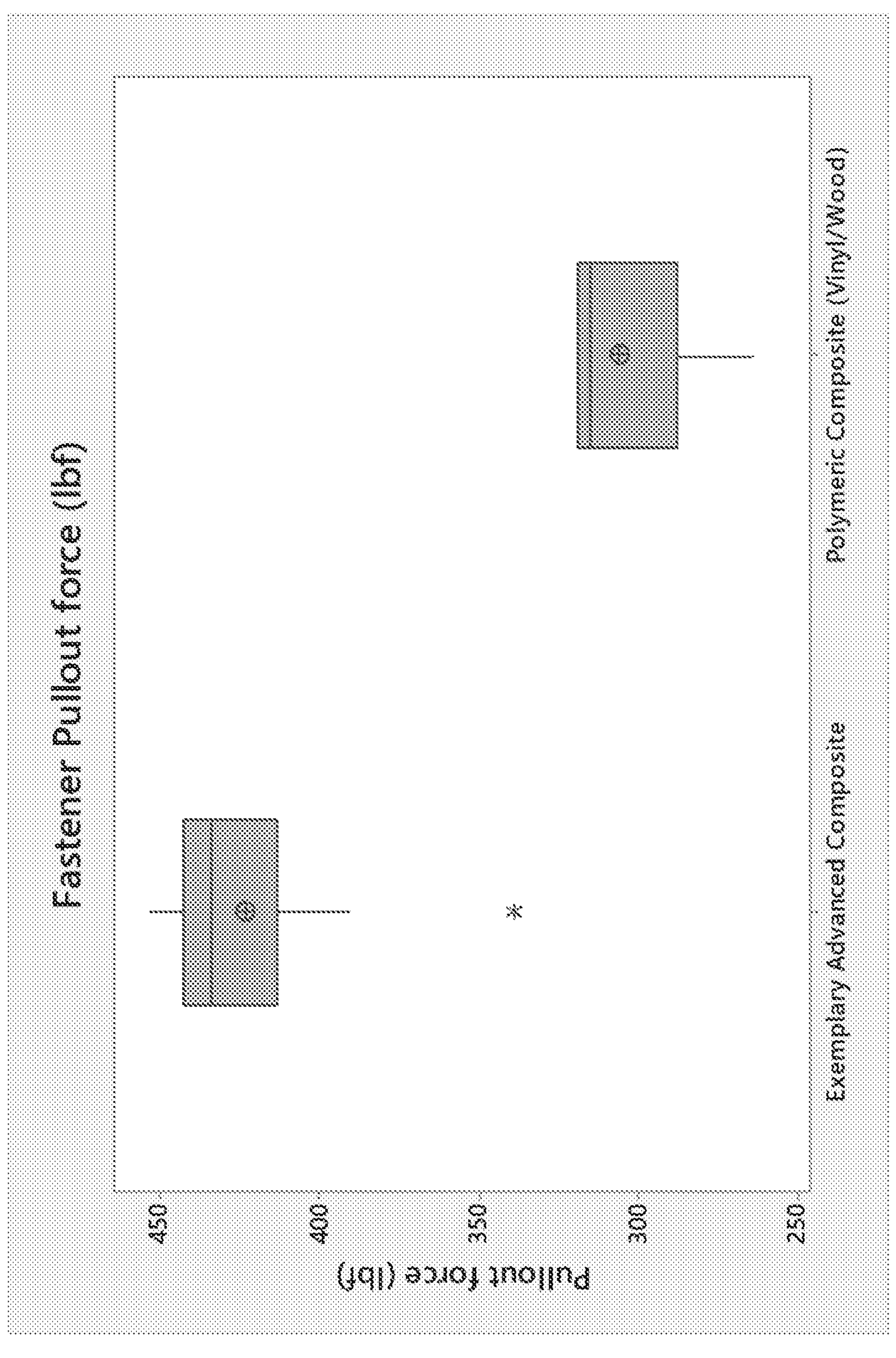
FIG. 28 is a graph showing fastener pullout force for various material samples.

The sample was then fixtured in the UTM and tested for peak load failure. The results are shown in FIG. 28. The average measured value for an exemplary advanced composite measured 423 lbf compared to a wood/vinyl polymeric composite measuring 306 lbf. This example shows that advanced composites herein exhibit a remarkable enhancement with respect to retaining fasteners.

Example 5: Fine Feature Detail

Existing composite materials sometimes require the use of a neat resin capstock or other better flowing material to create fine geometry, because the existing composite materials cannot successfully be used to create such fine geometry. However, advanced composite materials herein allow the direct extrusion of these fine features without requiring a separate neat resin or other better flowing material and also allows for greater flexibility in downstream processing for aesthetics (painting, e.g.).

Specific feature testing was performed on a hollow square profile (features cut at 0.010", 0.020", 0.030", and 0.050" mandrel depth) to highlight comparison of feature creation between polymeric wood/vinyl composites and advanced composite formulations.

Figure 29:
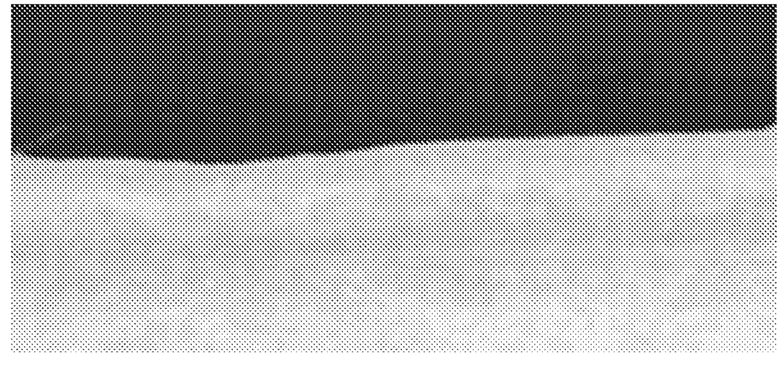
FIG. 29 is a side-view of a surface of an advanced composite herein.
Figure 30:
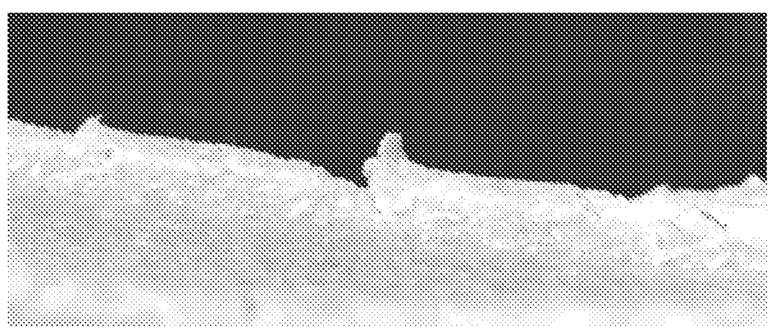
FIG. 30 is a side-view of a surface of vinyl/wood composite.
Figure 31:
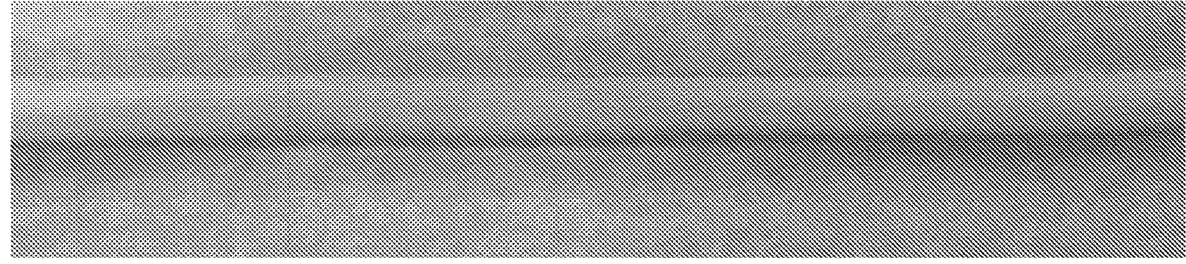
FIG. 31 is a top-view of a fine feature formed with an advanced composite herein.
Figure 32:
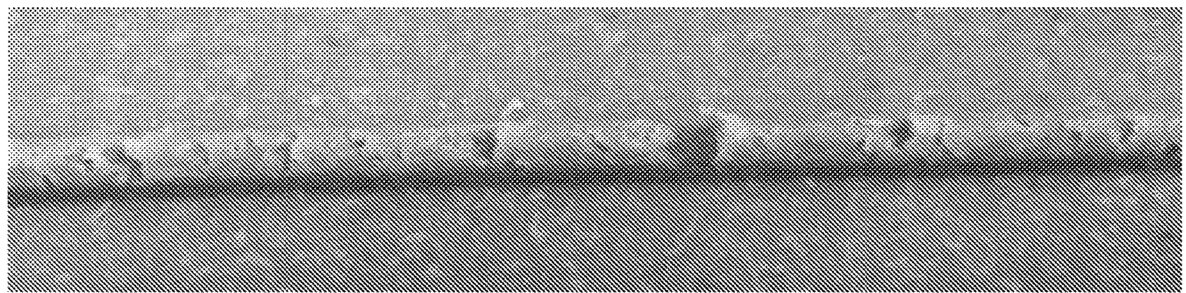
FIG. 32 is a top-view of a fine feature of vinyl/wood composite.

One example of this relationship can be described best by reviewing the material fracture along the internal feature surface. It was demonstrated that the advanced composite samples which include the glass fiber reinforcement did not display material fracture (FIG. 29—side view of advanced composite (30% glass, 0% wood—EXP1) of 0.050" feature size) whereas the polymeric vinyl/wood composite material samples (40% wood particles, 0% glass—COMP1) experiences material fracture the full width and depth of the feature (FIG. 30—side view of polymeric vinyl/wood composite of 0.050" feature size). This was observed in each of the tested feature sizes, 0.010", 0.020", 0.030" and 0.050" on the extruded sample. FIG. 31 shows a top view of an advanced composite (30% glass, 0% wood—EXP1) of 0.050" feature size. In comparison, FIG. 32 shows a top view of a polymeric vinyl/wood composite (40% wood particles, 0% glass—COMP1) of 0.050" feature size.

It was found that the advanced composite materials enabled proper definition of smaller features and further allow this material to serve as a capstock, final feature definition layer, or most-exterior extruded layer of the extruded article (it being appreciated that non-extruded coatings such as paint layers or the like could be applied on the exterior in some embodiments).

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

The invention claimed is:

1. An extruded article for a building component comprising:

a body member comprising a wall surrounding at least one enclosed interior channel in cross-section, the wall comprising a first extruded portion defining a first segment of a perimeter of the at least one enclosed interior channel, the first extruded portion comprising a first composition, the first composition comprising:

a polymer resin; and at least 20 wt. % wood particles;

a second extruded portion defining a second segment of the perimeter of the at least one enclosed interior channel, the second extruded portion contacting the first extruded portion, the second extruded portion comprising a second composition different than the first composition, the second composition comprising:

a polymer resin; and from 2 to 50 wt. % glass fibers;

wherein a lateral cross-section of the wall includes a portion of the first extruded portion and a portion of the second extruded portion, wherein the lateral cross-section is taken perpendicular to a longitudinal axis of the body member and the lateral cross-section extends through the at least one enclosed interior channel;

wherein the perimeter of the at least one enclosed interior channel defines the boundary of the at least one enclosed interior channel;

wherein the first portion defines an enclosed channel with the second portion disposed within the enclosed channel defined by the first portion.

2. The extruded article of claim 1, further comprising a third extruded portion comprising a third composition, the third composition different than the first composition and the second composition.

3. The extruded article of claim 2, the third extruded portion disposed over the first and second extruded portions as a capstock layer.

4. The extruded article of claim 1, the glass fibers having an average length after extrusion of 0.2 mm to 10 mm and an average diameter of about 2 microns to about 50 microns.

5. The extruded article of claim 1, the first extruded portion further comprising a first lateral wall.

6. The extruded article of claim 1, the body member comprising an outer radius curved wall; and an inner radius curved wall;

wherein the second extruded portion forms at least part of the outer radius curved wall.

7. The extruded article of claim 6, the outer radius curved wall having a radius of curvature of 6 inches to 72 inches.

8. The extruded article of claim 1, the second composition comprising from 10 to 20 wt. percent glass fibers.

9. The extruded article of claim 1, the second composition further comprising wood particles.

10. A building component comprising:

a body member comprising an extruded portion defining a first segment of a perimeter of an interior channel, the extruded portion comprising a first composition, the first composition comprising:

a polymer resin; and at least 20 wt. % wood particles;

a pultruded portion defining a second segment of the perimeter of the interior channel, the pultruded portion contacting the extruded portion, the pultruded portion comprising a second composition different than the first composition, the second composition comprising:

a polymer resin; and glass fibers;

wherein the perimeter of the interior channel defines the boundary of the interior channel;

wherein the extruded portion defines an enclosed channel with the pultruded portion disposed within the enclosed channel defined by the extruded portion.

11. The building component of claim 10, further comprising a wall surrounding at least one interior channel in cross-section, the wall comprising the extruded portion and the pultruded portion.

12. The building component of claim 10, the second composition comprising from 10 to 90 wt. % glass fibers.

13. The building component of claim 10, the glass fibers having an average length of greater than 20 millimeters.

14. An extruded article for a building component comprising:

a body member comprising a wall surrounding at least one enclosed interior channel in cross-section, the wall comprising a first extruded portion defining a first segment of a perimeter of the at least one enclosed interior channel, the first extruded portion comprising a first composition, the first composition comprising:

a polymer resin; and at least 20 wt. % organic material particles;

a second extruded portion defining a second segment of the perimeter of the at least one enclosed interior channel, the second extruded portion contacting the first extruded portion, the second extruded portion comprising a second composition different than the first composition, the second composition comprising:

a polymer resin; and from 2 to 50 wt. % carbon fibers;

wherein a lateral cross-section of the wall includes a portion of the first extruded portion and a portion of the second extruded portion, wherein the lateral cross-section is taken perpendicular to a longitudinal axis of the body member and the lateral cross-section extends through the at least one enclosed interior channel;

wherein the perimeter of the at least one enclosed interior channel defines the boundary of the at least one enclosed interior channel;

wherein the first extruded portion defines an enclosed channel with the second extruded portion disposed within the enclosed channel defined by the first portion.

15. The extruded article for a building component of claim 14, the second composition comprising from 10 to 20 wt. percent carbon fibers.

* * * * *